US011875627B2

(12) United States Patent
Davis

(10) Patent No.: US 11,875,627 B2
(45) **Date of Patent: *Jan. 16, 2024**

(54) ELECTRONIC GAMING SYSTEM PROVIDING REPEAT WIN AMOUNTS FOR USE DURING VOLATILITY SELECTION FEATURE GAMES

(71) Applicant: Aristocrat Technologies Australia Pty Limited, North Ryde (AU)

(72) Inventor: Blake Davis, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,415

(22) Filed: Sep. 19, 2022

(65) Prior Publication Data

US 2023/0010896 A1 Jan. 12, 2023

Related U.S. Application Data

(63) Continuation of application No. 16/779,441, filed on Jan. 31, 2020, now Pat. No. 11,450,180.

(30) Foreign Application Priority Data

Apr. 17, 2019 (AU) ................................ 2019901336
Aug. 12, 2019 (AU) ................................ 2019216601

(51) Int. Cl.
*G07F 17/32* (2006.01)
*G07F 17/34* (2006.01)

(52) U.S. Cl.
CPC ...... *G07F 17/3267* (2013.01); *G07F 17/3209* (2013.01); *G07F 17/3213* (2013.01); *G07F 17/3239* (2013.01); *G07F 17/34* (2013.01)

(58) Field of Classification Search
CPC ............ G07F 17/3244; G07F 17/3267; G07F 17/3209; G07F 17/3213; G07F 17/3239; G07F 17/34
See application file for complete search history.

(56) References Cited

U.S. PATENT DOCUMENTS 5,275,400 A * 1/1994 Weingardt .............. G07F 17/32 463/28
6,142,872 A * 11/2000 Walker ................ G07F 17/3239 463/16

(Continued)

OTHER PUBLICATIONS

Gaming Slots, Big Red, https://www.gamingslots.com/slots/aristocrat/big-red-slot/, retrieved on Jan. 31, 2020.

(Continued)

*Primary Examiner* — Dmitry Suhol
*Assistant Examiner* — Jason Pinheiro
(74) *Attorney, Agent, or Firm* — Armstrong Teasdale LLP

(57) ABSTRACT

An electronic gaming system includes a display device, a memory, and a processor. The processor is configured to perform a variety of operations, including, for example, determining whether a trigger condition has occurred during a base game, and determining a repeat win amount during the base game. In at least some embodiments, the processor is also configured to control the display device to display a plurality of selections, each selection corresponding to a feature game, in response to occurrence of the trigger condition. Each feature game may be associated with a win volatility and displayed in association with information about the win volatility, and each win volatility may be based, at least in part, upon the repeat win amount determined during the base game.

20 Claims, 25 Drawing Sheets

(56) References Cited

U.S. PATENT DOCUMENTS

| | | | | |
|---|---|---|---|---|
| 6,146,271 | A * | 11/2000 | Kadlic | A63F 3/00157 463/13 |
| 6,244,958 | B1 * | 6/2001 | Acres | G07F 17/3281 463/16 |
| 7,291,068 | B2 * | 11/2007 | Bryant | G07F 17/32 463/16 |
| 7,819,742 | B2 * | 10/2010 | Chamberlain | G07G 5/00 463/16 |
| 9,196,130 | B2 | 11/2015 | Saunders | |
| 9,852,579 | B2 * | 12/2017 | Caputo | G07F 17/3227 |
| 2001/0031659 | A1 * | 10/2001 | Perrie | A63F 3/0645 463/18 |
| 2002/0043759 | A1 * | 4/2002 | Vancura | A63F 9/183 273/139 |
| 2002/0045474 | A1 * | 4/2002 | Singer | G07F 17/3216 463/20 |
| 2009/0088239 | A1 | 4/2009 | Iddings | |
| 2010/0048283 | A1 | 2/2010 | Anderson | |
| 2010/0124969 | A1 | 5/2010 | Hughes | |
| 2012/0115581 | A1 | 5/2012 | Englman | |
| 2014/0004923 | A1 * | 1/2014 | Lind | G07F 17/32 463/19 |
| 2014/0087808 | A1 | 3/2014 | Basallo | |
| 2014/0141864 | A1 | 5/2014 | Ward | |
| 2014/0256402 | A1 * | 9/2014 | Caputo | G07F 17/3267 463/20 |
| 2015/0045106 | A1 * | 2/2015 | You | G07F 17/3267 463/20 |
| 2016/0093151 | A1 * | 3/2016 | Hawkins | G07F 17/3246 463/21 |
| 2017/0228976 | A1 | 8/2017 | Chesworth | |
| 2019/0244480 | A1 * | 8/2019 | Marsh | G07F 17/3213 |
| 2019/0295380 | A1 * | 9/2019 | Casey | G07F 17/3276 |

OTHER PUBLICATIONS

Casino Directory, 5 Dragon Slots, https://onlineworldcasinodirectory.com/aristocrat/5-dragons-slots, retrieved Jan. 31, 2020, 5 pages.

Office Action (Non-Final Rejection) dated Jan. 24, 2022 for U.S. Appl. No. 16/779,441 (pp. 1-7).

* cited by examiner

400

| | Reel position | Reel 1 (421) | Reel 2 (422) | Reel 3 (423) | Reel 4 (424) | Reel 5 (425) |
|---|---|---|---|---|---|---|
| 401 | 1 | J | 10 | J | A | J |
| 402 | 2 | PIC3 | PIC3 | PS1 | 10 | PIC3 |
| 403 | 3 | Q | J | PS1 | PIC1 | 10 |
| 404 | 4 | K | PIC1 | 10 | K | PIC1 |
| 405 | 5 | PS1 | 10 | K | PS1 | Q |
| 406 | 6 | PS1 | PS1 | PIC3 | A | PS1 |
| 407 | 7 | PS1 | K | A | PIC4 | PS1 |
| 408 | 8 | A | PIC4 | PIC4 | 10 | PS1 |
| 409 | 9 | PIC1 | 10 | 10 | J | A |
| 410 | 10 | 10 | PIC2 | PIC2 | PIC1 | PIC2 |
| 411 | 11 | Q | K | J | WILD | J |
| 412 | 12 | PIC3 | PIC4 | Q | WILD | WILD |
| 413 | 13 | J | 10 | WILD | WILD | WILD |
| 414 | 14 | PIC4 | WILD | WILD | WILD | WILD |
| 415 | 15 | Q | WILD | WILD | WILD | WILD |

432 431 442 443 441

FIG. 4

900

| | Reel position | Reel 1 (921) | Reel 2 (922) | Reel 3 (923) | Reel 4 (924) | Reel 5 (925) | |
|---|---|---|---|---|---|---|---|
| 901 | 1 | PIC2 | 10 | J | PS2 | J | |
| 902 | 2 | J | PS2 | PS1 | 10 | PS2 | 932 |
| 903 | 3 | PIC3 | J | PS1 | 10 | 10 | |
| 904 | 4 | K | PIC1 | 10 | K | PIC1 | |
| 905 | 5 | PS1 | 10 | Q | PS1 | Q | |
| 906 | 6 | PS1 | PS1 | PS2 | A | PS1 | 930 |
| 907 | 7 | PS1 | K | A | PIC4 | PS1 | |
| 908 | 8 | A | PIC4 | PIC4 | 10 | PS1 | |
| 909 | 9 | PIC1 | 10 | 10 | J | A | |
| 910 | 10 | 10 | PIC1 | PIC2 | WILD | PIC2 | |
| 911 | 11 | Q | K | J | WILD | J | |
| 912 | 12 | PS2 | PIC4 | Q | WILD | WILD | |
| 913 | 13 | J | 10 | WILD | WILD | WILD | |
| 914 | 14 | PIC4 | J | WILD | WILD | WILD | |
| 915 | 15 | Q | WILD | WILD | 10 | WILD | |

*FIG. 9*

ELECTRONIC GAMING SYSTEM PROVIDING REPEAT WIN AMOUNTS FOR USE DURING VOLATILITY SELECTION FEATURE GAMES

CROSS-REFERENCE TO RELATED APPLICATIONS

This application claims priority to U.S. patent application Ser. No. 16/779,441, filed Jan. 31, 2020 and entitled ELECTRONIC GAMING SYSTEM PROVIDING REPEAT WIN AMOUNTS FOR USE DURING VOLATILITY SELECTION FEATURE GAMES, which claims priority to Australian Patent Application Serial No. 2019216601, filed Aug. 12, 2019 and entitled A GAMING SYSTEM, which claims priority to Australian Provisional Patent Application Serial No. 2019901336, filed Apr. 17, 2019, and entitled A GAMING SYSTEM, both of which are incorporated by reference herein in their entirety.

FIELD

The present application relates to a gaming system and to a method of gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

A gaming system is described that implements a base game and a feature game when the feature game is triggered by an outcome in the base game. If a feature is triggered, the outcome in the base game is used to produce a repeat win amount that forms the basis of a repeat win prize awarded to a player if a particular symbol is selected and displayed during the feature game. The repeat win prize may be the same as the repeat win amount, a multiple of the repeat win amount and/or may include a bonus amount. In addition, when a feature is triggered, the player is provided with the option of choosing a feature from several features that have different win volatilities. For example, the player may select a feature based on prospective repeat win prize and associated win occurrence probability, or number of free games.

A gaming system is described that comprises at least one display, a game controller that includes at least one processor and at least one memory device. The at least one processor, the at least one memory device, and the at least one display are operably connected, and the at least one memory device stores computer-readable instructions for controlling the at least one processor to implement a base game, and determine whether a trigger condition has occurred during the base game. The instructions also cause the at least one processor to implement a feature when a trigger condition is determined to have occurred in the base game, wherein the feature is selectable from a plurality of features, at least some of the plurality of features have different associated win volatilities, and information indicative of the respective win volatilities of the plurality of selectable features is displayed. The instructions also cause the at least one processor to determine a repeat win amount based on an outcome of the base game, and award a repeat win prize based on the repeat win amount during a selected feature when at least one defined prize symbol is displayed in the feature.

A method of gaming is described that comprises implementing a base game and displaying base game outcomes on a display and determining whether a trigger condition has occurred during the base game. The method also comprises displaying information indicative of a plurality of features when a trigger condition is determined to have occurred in the base game, and displaying information indicative of the respective win volatilities of the plurality of features, wherein at least some of the plurality of features have different associated win volatilities. The method facilitates selection of a feature by a player, determines a repeat win amount based on an outcome of the base game, and awards a repeat win prize based on the repeat win amount during a selected feature when at least one defined prize symbol is displayed in the feature.

In at least one aspect, an electronic gaming system is described. The system includes a display device, a memory, and a processor. The processor is configured to perform a variety of operations, including, for example, initiating display of a base game, determining whether a trigger condition has occurred during the base game, and determining a repeat win amount during the base game. In at least some embodiments, the processor is also configured to control the display device to display a plurality of selections, each selection corresponding to a feature game of a plurality of feature games, in response to occurrence of the trigger condition. Each feature game may be associated with a win volatility and displayed in association with information about the win volatility, and each win volatility may be based, at least in part, upon the repeat win amount. Further, in some embodiments, the processor may be configured to receive a player selection, via an input device, corresponding to a feature game of the plurality of feature games, initiate display of the player selected feature game, and/or award a repeat win prize, the repeat win prize based on the repeat win amount in response to at least one prize symbol being displayed during the player selected feature game.

BRIEF DESCRIPTION OF THE DRAWINGS

FIG. 4 illustrates an example base game reel strip layout.

FIG. 9 illustrates an example feature game reel strip layout.

DETAILED DESCRIPTION

Figure 1:
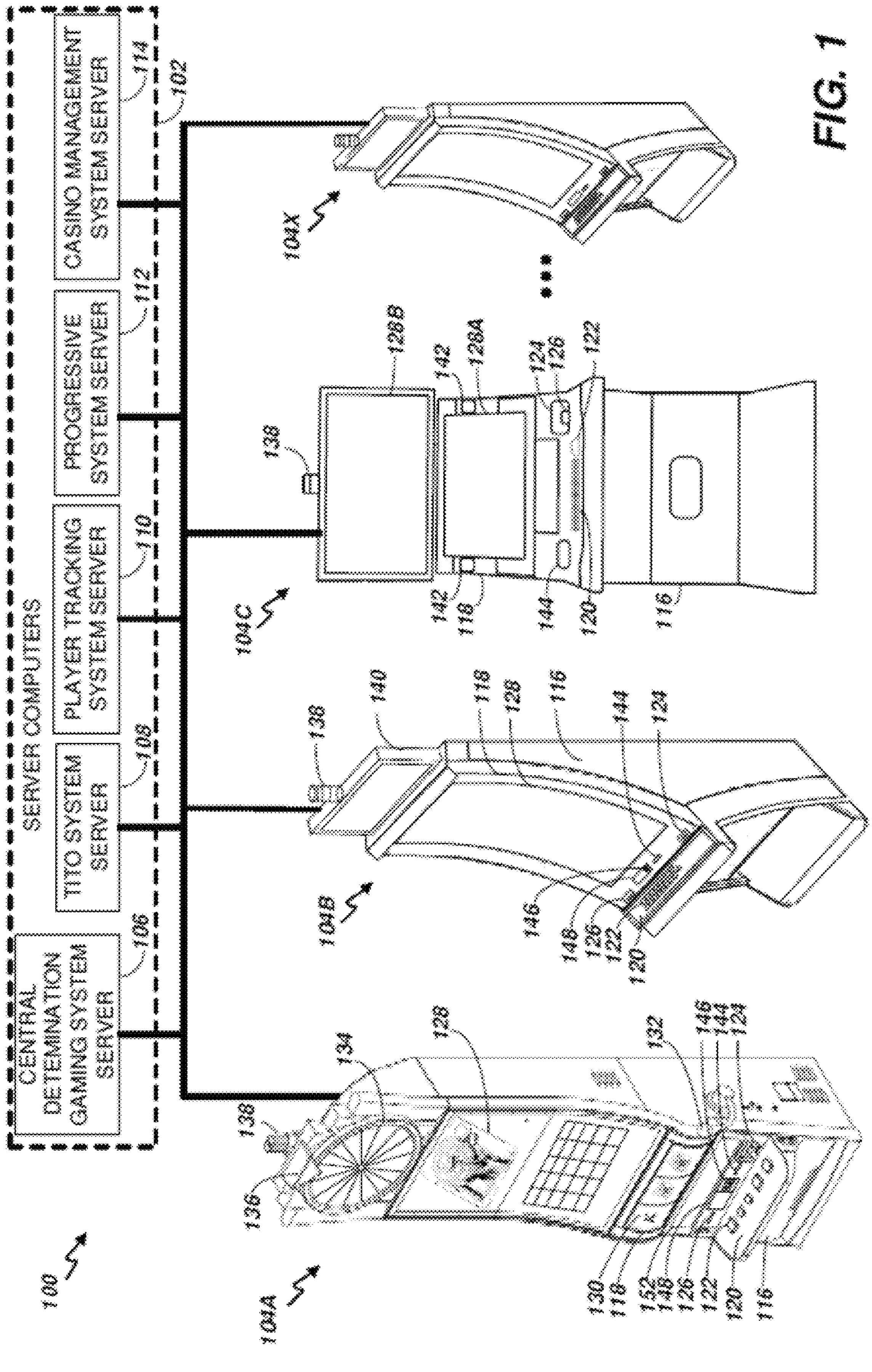
FIG. 1 is an exemplary diagram showing several EGMs networked with various gaming related servers.

FIG. 1 illustrates several different models of EGMs which may be networked to various gaming related servers. The present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present disclosure may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
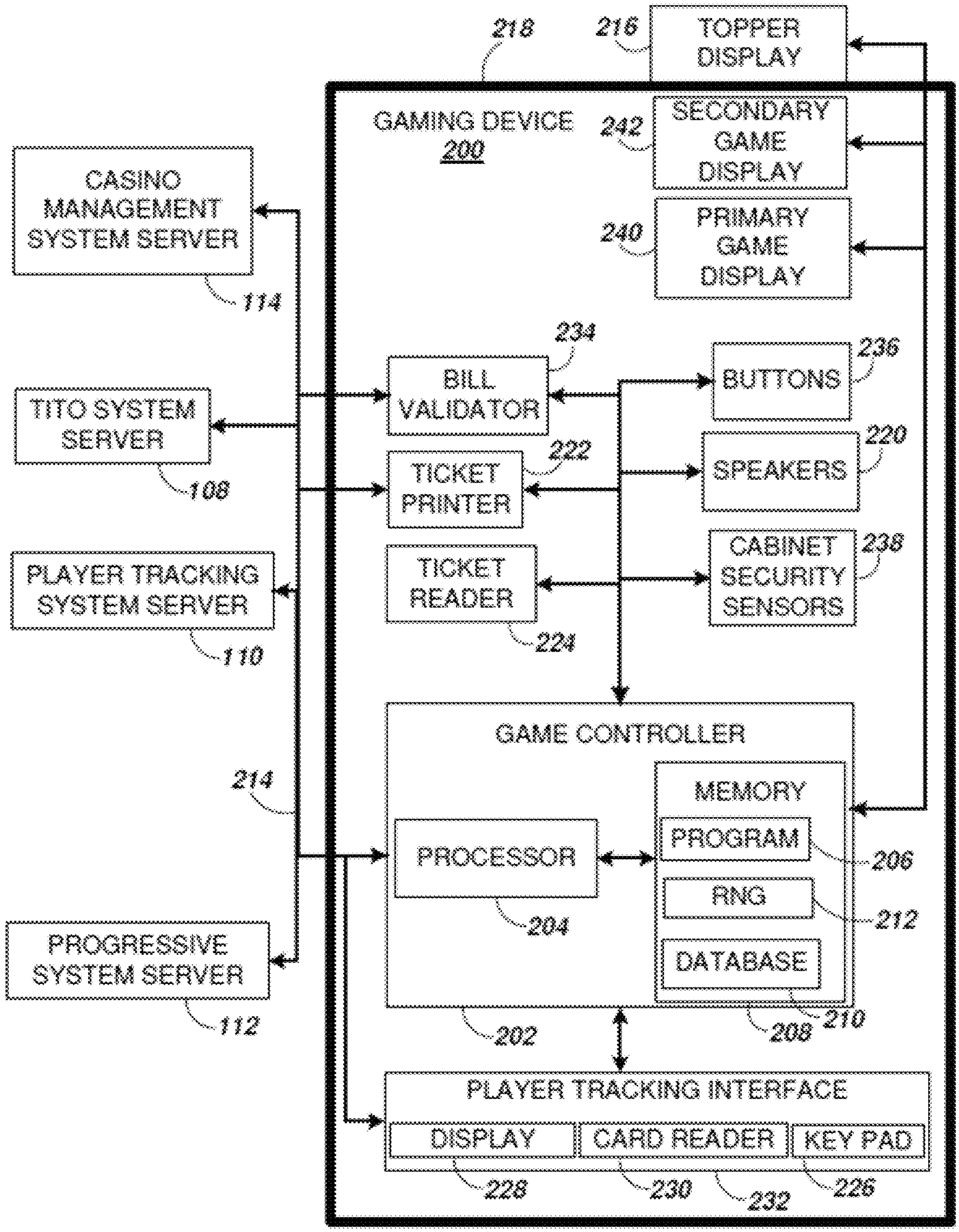
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
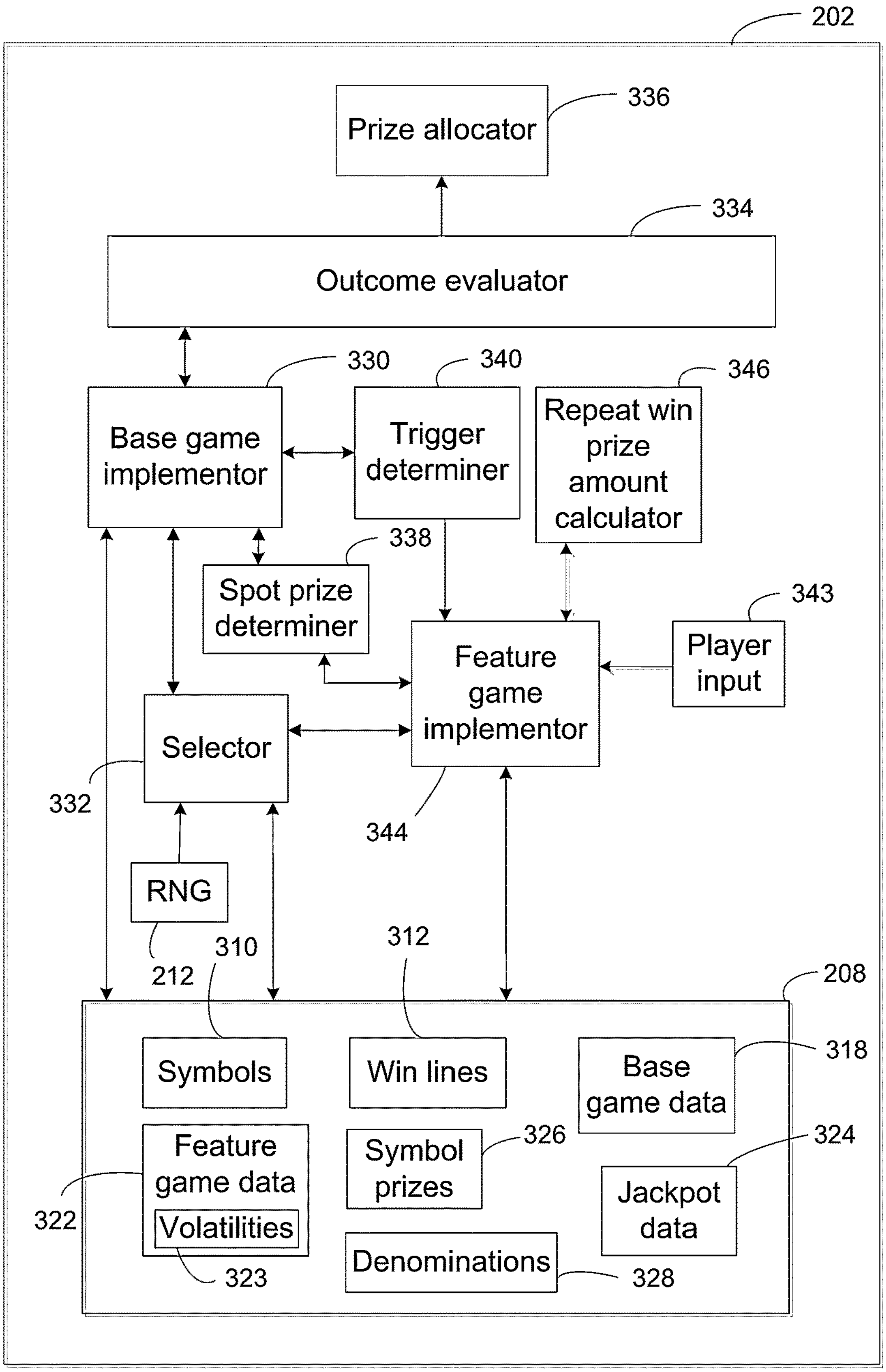
FIG. 3 is a block diagram showing functional components implemented by a game controller.

FIG. 3. illustrates a block diagram showing functional components implemented by the game controller 202. In this example, the functional components comprise data stored in the memory 208, including data indicative of symbols 310; data indicative of win lines 312; base game data 318 defining characteristics of a base game; feature game data 322 defining characteristics of several feature game configurations, including win volatilities 323 for the feature game configurations; and jackpot data 324 defining characteristics of available bonus and jackpot arrangements, including characteristics of accumulation and awarding of bonuses and jackpots, and current bonus and jackpot amounts. The memory 208 also includes symbol prize data 326 indicative of spot prizes associated with defined symbols, and denomination data 328 indicative of available denomination amounts.

The functional components also include a base game implementer 330 arranged to implement base games using a selector 332 to select symbols using the symbols data 310 for display at a plurality of symbol positions in a symbol array using the random number generator 212. Outcomes of a base game are determined by an outcome evaluator 334 and any applicable prize is awarded by a prize allocator 336, for example based on a base game pay table.

In this example, the functional components also include a spot prize determiner 338 arranged to determine whether the selected and displayed symbols during a base game correspond to one or more spot prizes. In this example, at least one prize symbol is provided and each prize symbol has an associated spot prize such that selection and display of the prize symbol causes the spot prize associated with the displayed prize symbol to be awarded to a player. A spot prize may for example be a defined amount, or an amount that is dependent on the amount bet.

The spot prize determiner 338 also determines whether to award a bonus or jackpot, in this example based on whether a prize symbol with an associated bonus or jackpot has been selected for display in the symbol array. A plurality of bonus prizes may be provided that have different associated bonus values, such as 2 bonus values referred to as MINI and MINOR bonus values that have different respective win probabilities. Similarly, a plurality of jackpots may be provided that have different associated jackpot values, such as 2 jackpot values referred to as MAJOR and GRAND jackpots that have different respective win probabilities.

The functional components also include a trigger condition determiner 340 arranged to make a determination based on an event during a base game as to whether to commence a feature that includes at least one free game, for example based on whether a trigger condition has occurred during the base game such as selection and display of a defined number of trigger symbols during the base game. In an example, selection and display of at least 5 prize symbols constitutes a trigger condition, although it will be understood that any suitable trigger condition is envisaged.

Bonus prizes and/or jackpots may be of progressive type wherein the gaming device progressively contributes an amount of credits to one or more bonus and/or jackpot pools based for example on defined conditions during game play. In this example, the bonus and jackpot prizes have different values such that the prize values of the MINI bonus, MINOR bonus, MAJOR jackpot and GRAND jackpots are of increasing size.

After a feature has triggered, a player is able to input 343 a feature selection from a plurality of available features that have different win volatilities.

The functional components also include a feature game implementor 344 arranged to implement a feature after a trigger condition has occurred during a base game, and a repeat win prize amount calculator 346 arranged to calculate a repeat win amount for use during the feature game(s), in this example based on a sum of the spot prize amounts associated with the prize symbols displayed during a base game that caused a trigger condition to occur.

In this example, the feature game implementor 344 is also arranged to queue a further feature after a trigger condition has occurred during a feature game.

Outcomes of a feature game are in this example also determined by the outcome evaluator 334 and any applicable prize is awarded by the prize allocator 336.

FIG. 4 illustrates an example of a set 400 of five reel strips 421, 422, 423, 424, 425. In the example, each reel strip has fifteen reel strip positions 401-415. Each reel strip position of each reel has a symbol. For example, a "Wild" symbol 431 occupies the eleventh reel strip position 411 of the fourth reel 424. The reel strips also include several first prize symbols 432. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual length of the feature game reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 5:
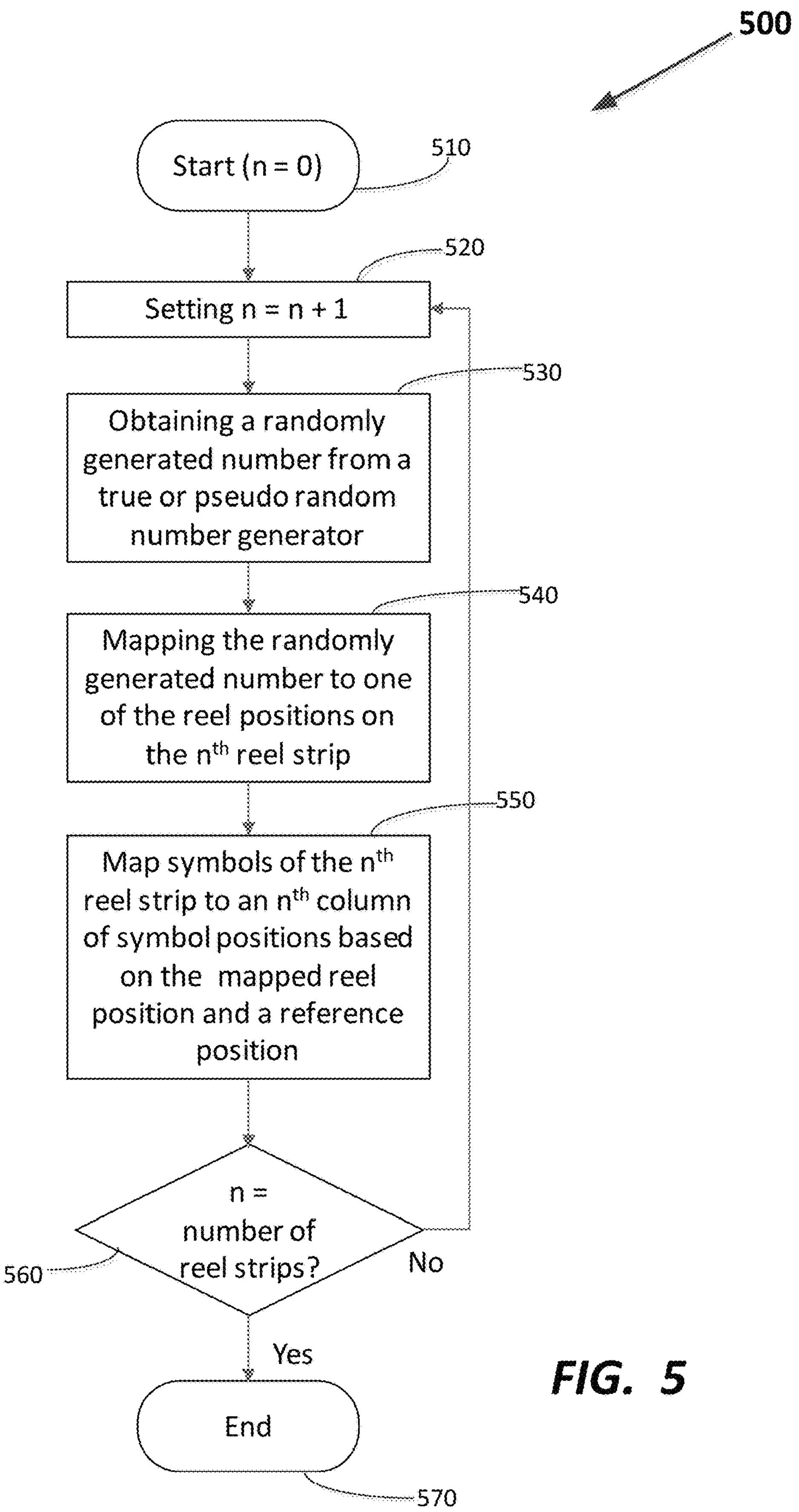
FIG. 5 is a flow chart of an example symbol selection method.

FIG. 5 is a flow chart of a method 500 carried out by the processor 204 to select symbols from reel strips. At step 510, the processor 204 starts the process of selecting symbols with a counter (n) set at zero as symbols have not yet been selected from any reel strips. At step 520, the processor 204 increments the counter. In the first iteration, the counter is set to 1 to reflect that symbols are to be selected from a first reel strip. At step 530 the processor obtains a randomly generated number from a true or pseudo random number generator 212. At step 540 the processor maps the generated number to one of the reel positions of the $n^{th}$ reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 550, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 3, if the value returned by the RNG 212 is mapped to reel position 413, then for the first reel strip 421, "J" symbol 442 is mapped to a bottom symbol position, "PIC3" symbol 443 is mapped to a middle symbol position, and "Q" symbol is mapped to a top symbol position 444.

At step 560, the processor 560 determines whether symbols have been selected for all of the reel strips, and if not the processor reverts to step 520 and iterates through steps 530, 540 and 550 until it is determined at step 560 that symbols have been selected from all n reel strips and mapped to all n columns of symbol positions after which the symbol selection process ends 570. Different numbers of symbols may be mapped to different numbers of symbol positions.

After the symbols of all reel strips have been mapped to symbol positions, the processor 204 controls display 240 to display them at the symbol positions.

An example implementation will now be described in relation to flow diagrams shown in FIGS. 6 to 8, 10 and 11 and screens displayed to a player on an example gaming machine, as shown in FIGS. 12 to 22.

Figure 6:
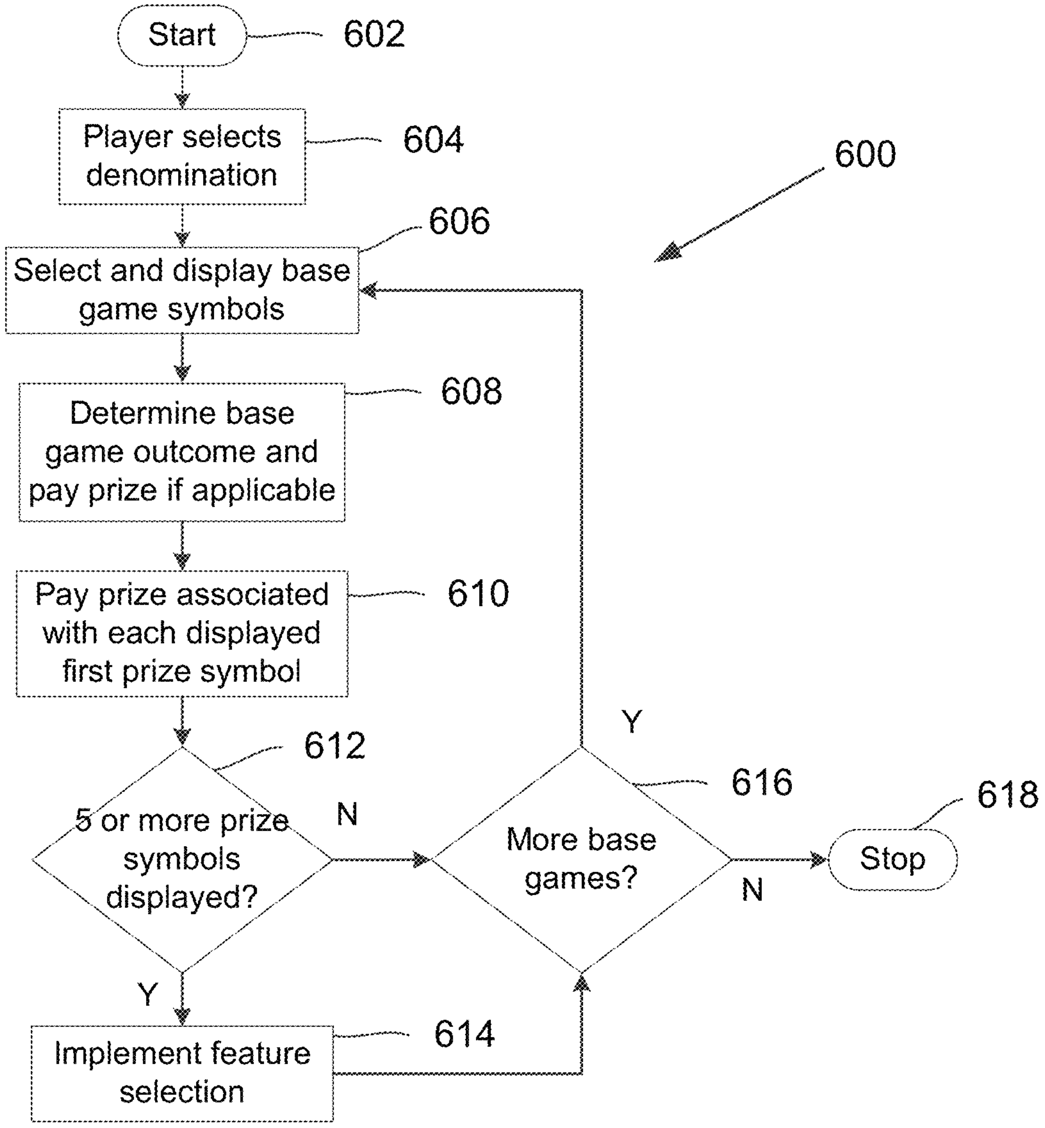
FIG. 6 is a flow chart illustrating an example base game play process of an example method of gaming.

A flow chart 600 illustrating an example process for implementing a base game is shown in FIG. 6.

As shown, prior to implementation of a base game, a player first selects a denomination that will be used for bets during the base games, as indicated at step 604. In this example, the available denominations are 1c, 2c, 5c, 10c, $1 and $2, although it will be understood that any suitable denomination is envisaged.

Figure 12:
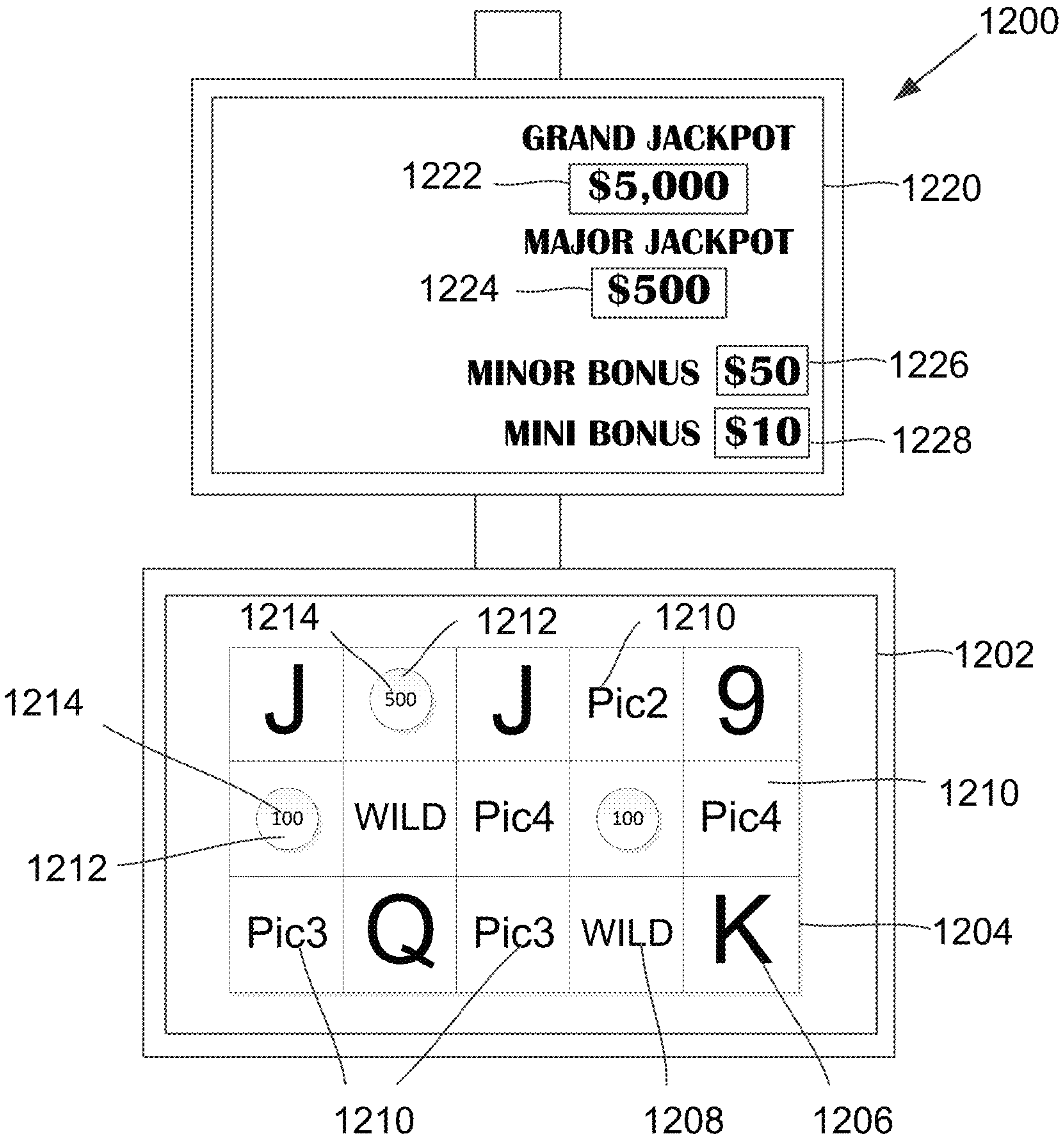
FIG. 12 is an example representation of screens of an EGM during implementation of a base game when no feature trigger condition exists.
Figure 13:
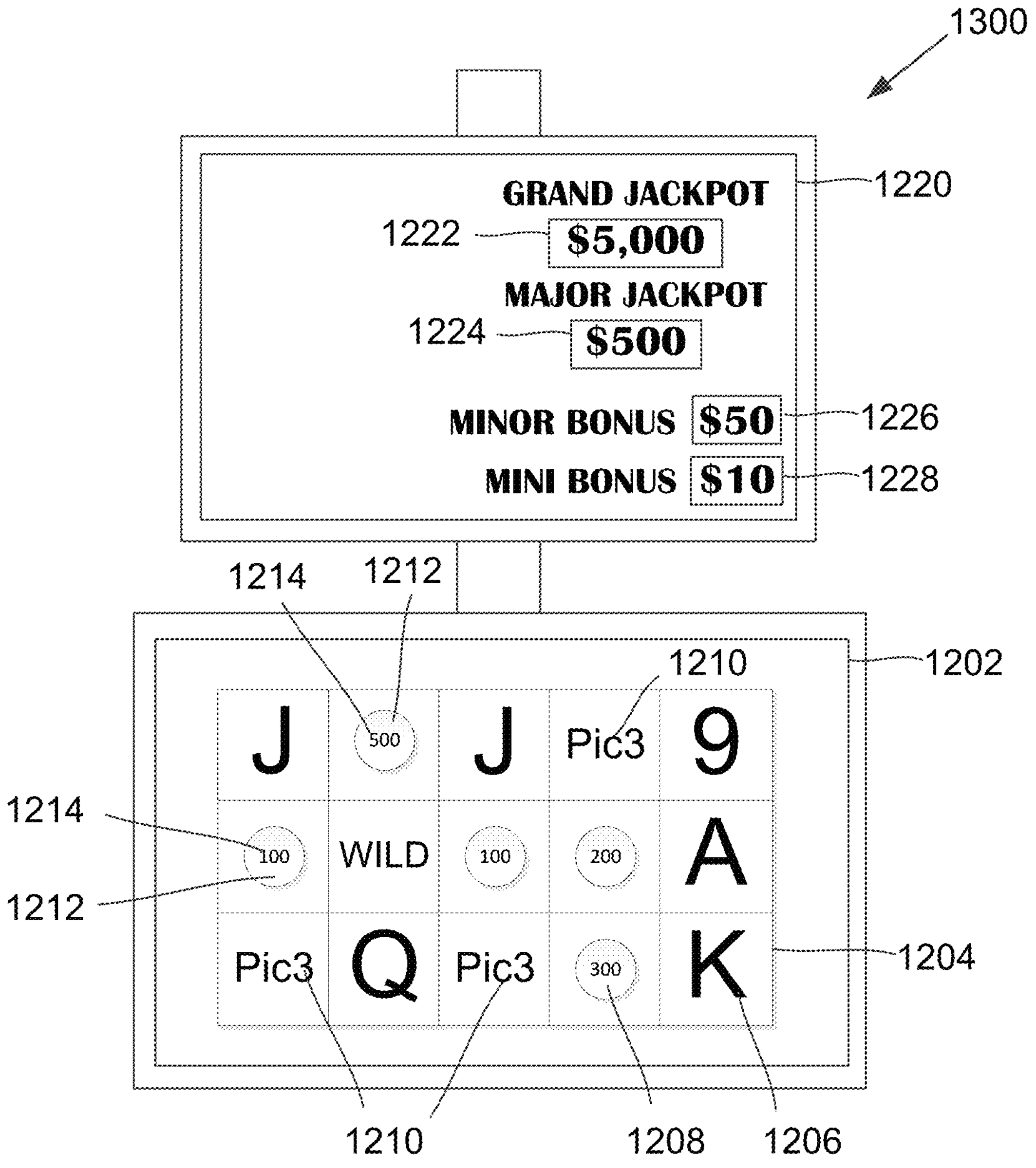
FIG. 13 is an example representation of screens of an EGM during implementation of a base game when a feature trigger condition exists.

Representations 1200, 1300 of screens displayed to a player on a gaming machine during implementation of a base game are shown in FIGS. 12 and 13.

After selection of the denomination, the selector 332 under control of the base game implementor 330 selects several symbols 310 using the random number generator 212, and the selected symbols are displayed in a symbol array 1204, as indicated at step 606 and shown in FIG. 12.

As shown in FIG. 12, the gaming machine includes a game screen 1202 on which a symbol array 1204 is displayed, the symbol array 1204 including selected symbols that may include standard symbols 1206, first prize symbols 1212 that are used to determine whether a feature game trigger condition exists and to determine the value(s) of spot prizes during the base game, and WILD symbols 1208 that substitute for any symbol except first prize symbols 1212.

Each first prize symbol 1212 has an associated prize identifier 1214 that either specifies a fixed spot prize amount or specifies that the prize identifier 1214 corresponds to a bonus amount (in this example a MINI or MINOR bonus amount) or corresponds to a jackpot amount (in this example a MAJOR or GRAND jackpot amount). In this example, the defined spot prize may be 1×, 2×, 3×, 4×, 5×, 6×, 7×, 8, 10×, 15×, 20× or 50× the credit bet amount, or the defined spot prize may be a MINI or MINOR bonus amount or a MAJOR or GRAND jackpot amount. The availability of the spot prizes may for example depend on the denomination selected by the player such that for example increasing denomination provides increasing values of available spot prizes.

In this example, the spot prize associated with a displayed first prize symbol is determined using weight tables, although it will be understood that any suitable arrangement for determining the spot prize for a displayed first prize symbol is envisaged.

During the base game, the player is awarded a prize based on the displayed combination of symbols, as indicated at step 608, and a spot prize is also awarded for each first prize symbol 1212 that is selected and displayed in the symbol array 1204, as indicated at step 610. Accordingly, in the example shown in FIG. 12 a total spot prize of 700 credits (that corresponds in this example to $7.00) is awarded to the player.

The spot prize associated with a displayed first prize symbol 1212 may be selected using a weighting table that may vary according to the denomination selected, the relevant reel and/or number of first prize symbols that are present on the reel.

Figure 14:
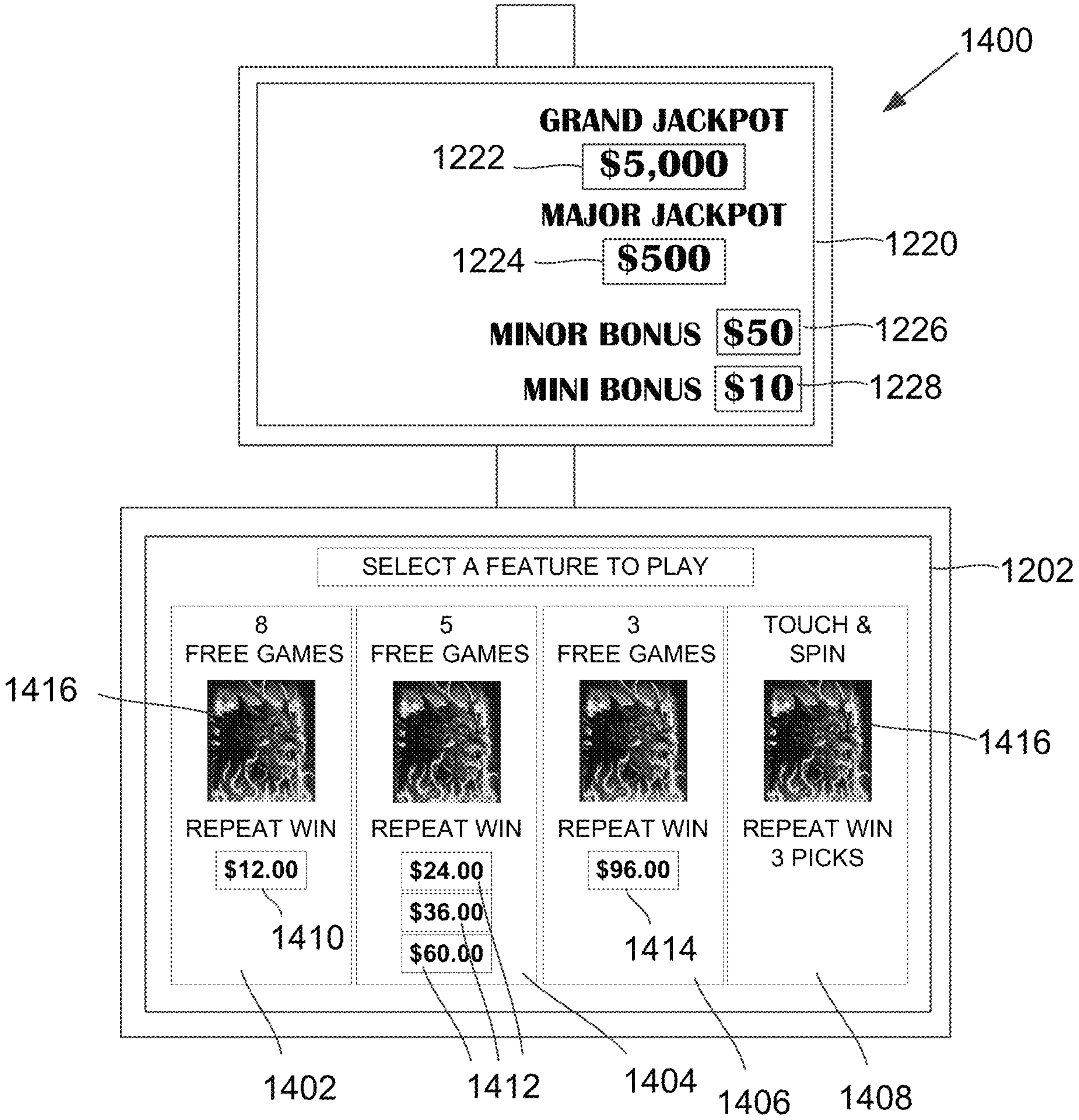
FIG. 14 is an example representation of screens of an EGM during selection of a feature.

If a feature trigger condition occurs, in this example if 5 or more first prize symbols 1212 are selected and displayed in the symbol array 1204, as indicated at step 612 and shown in FIG. 13, feature game selection options are displayed to the player to enable the player to select the feature that the player wishes to play, as indicated at step 614 and shown in FIG. 14. If a trigger condition has not occurred or after completion of the feature, if no more base games are available, the process ends, as indicated at steps 616 and 618.

As shown in FIGS. 12 and 13, in this example the gaming machine also includes a top screen 1220 arranged to display current bonus and jackpot amounts, in this example GRAND and MAJOR jackpot amounts 1222, 1224 and MINI and MINOR bonus amounts 1226, 1228.

The process for awarding jackpots will be described below in relation to FIGS. 11, 20, 21 and 22.

Figure 7:
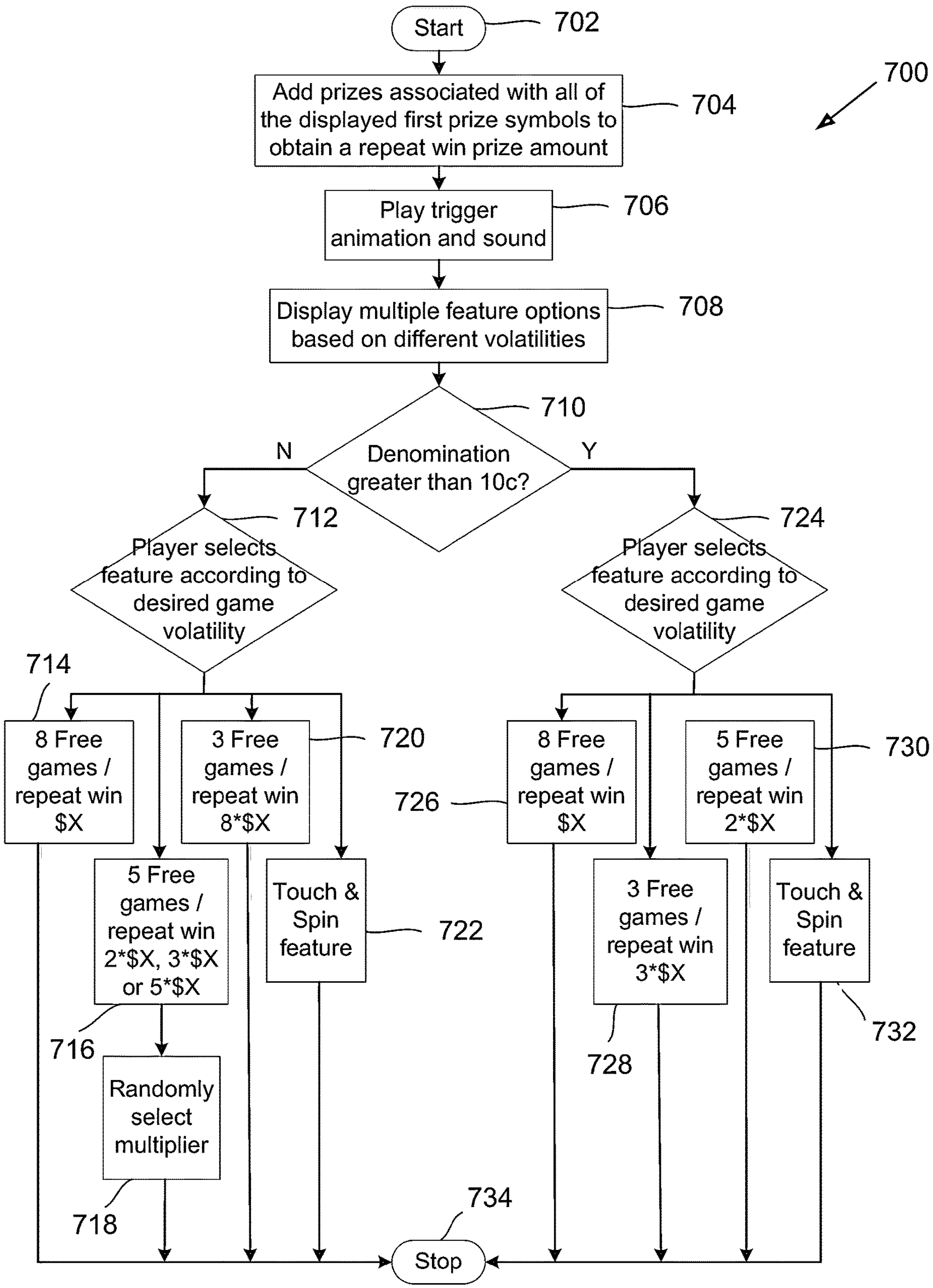
FIG. 7 is a flow chart illustrating an example feature selection process of an example method of gaming.

Representations 1400 of screens displayed to a player on a gaming machine after occurrence of a feature trigger condition during a base game are shown in FIG. 14. A flow chart 700 illustrating an example feature selection process is shown in FIG. 7.

As indicated at step 704, in order to define a repeat win prize amount, the prize amounts associated with the displayed first prize symbols 1212 of the feature trigger condition are added together, and a trigger animation and sound are produced to indicate that a feature trigger condition has occurred, as indicated at step 706.

As shown in FIG. 14 and indicated at step 708, indicia 1402, 1404, 1406 and 1408 representative of several selectable features are then displayed on the game screen 1202.

In this example, the features available for selection are dependent on the denomination initially selected by the player prior to commencing play of a base game, such that for denominations less than or equal to 10c a first set of features is available as indicated at steps 714, 716, 718, 720, and for denominations greater than 10c a second set of features is available, as indicated at steps 726, 728, 730, 732.

The available features are configured such that the player is provided with a choice of different volatilities, wherein for example the available prize for a first feature may be greater than the available prize for a second feature but the likelihood of obtaining the prize for the first feature is less than the likelihood of obtaining the prize for the second feature. In this example, four features are available, and for each feature at least one available prize is at least partly based on a repeat win amount that is calculated based on the sum of the prize amounts of the first prize symbols 1212 present in the trigger condition during the base game.

In this example, if the denomination is less than or equal to 10c, feature indicia 1402, 1404, 1406, 1408 representative of the following first set of features are displayed:

a first feature 714 that provides 8 free feature games and a repeat win prize amount 1410 that is equal to the sum of the prize amounts in the trigger condition;

a second feature 716 that provides 5 free feature games and a repeat win prize amount 1412 that is randomly selected 718 from several prize amounts, a first prize amount equal to twice the sum of the prize amounts in the trigger condition, a second prize amount equal to three times the sum of the prize amounts in the trigger condition, and a third prize amount equal to five times the sum of the prize amounts in the trigger condition;

a third feature 720 that provides 3 free feature games and a repeat win prize amount 1414 that is equal to eight times the sum of the prize amounts in the trigger condition; and a special fourth feature 722, referred to in this specification as a 'touch and spin' feature.

In each of the first, second and third features 1402, 1404, 1406, the repeat win prize amount 1410, 1412, 1414 is awarded to a player when a defined symbol is displayed during the feature game, in this example a second prize symbol.

In this example, the repeat win amount defined by the sum of the prize amounts in the trigger condition is 1200 units that corresponds to $12.00.

A feature may be selected by a user in any suitable way, for example using buttons or a touch screen associated with the game screen 1202.

In this example, if the denomination is greater than 10c, feature indicia (not shown) representative of the following second set of features are displayed:

- a first feature 726 that provides 8 free feature games and a repeat win prize amount 1410 that is equal to the sum of the prize amounts in the trigger condition;
- a second feature 728 that provides 3 free feature games and a repeat win prize amount 1412 that is equal to three times the sum of the prize amounts in the trigger condition;
- a third feature 730 that provides 5 free feature games and a repeat win prize amount 1414 that is equal to twice the sum of the prize amounts in the trigger condition; and
- a special fourth feature 732, referred to in this specification as a 'touch and spin' feature.

Figure 15:
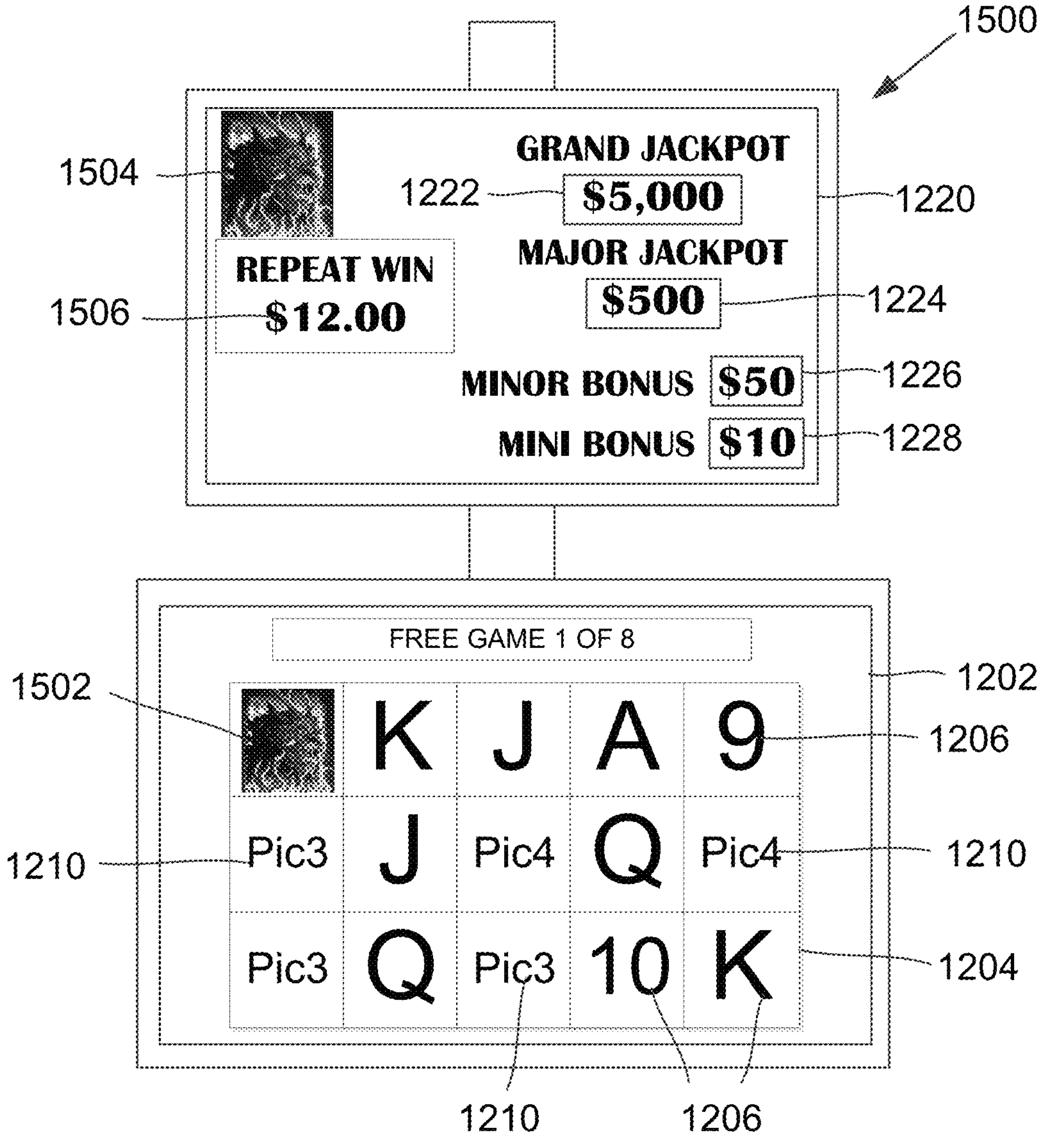
FIG. 15 is an example representation of screens of an EGM during implementation of a feature game.

Representations 1500 of screens displayed to a player on a gaming machine when the denomination is less than or equal to 10c and a first feature has been selected are shown in FIG. 15. A flow chart 800 illustrating an example feature implementation process is shown in FIG. 8.

Figure 8:
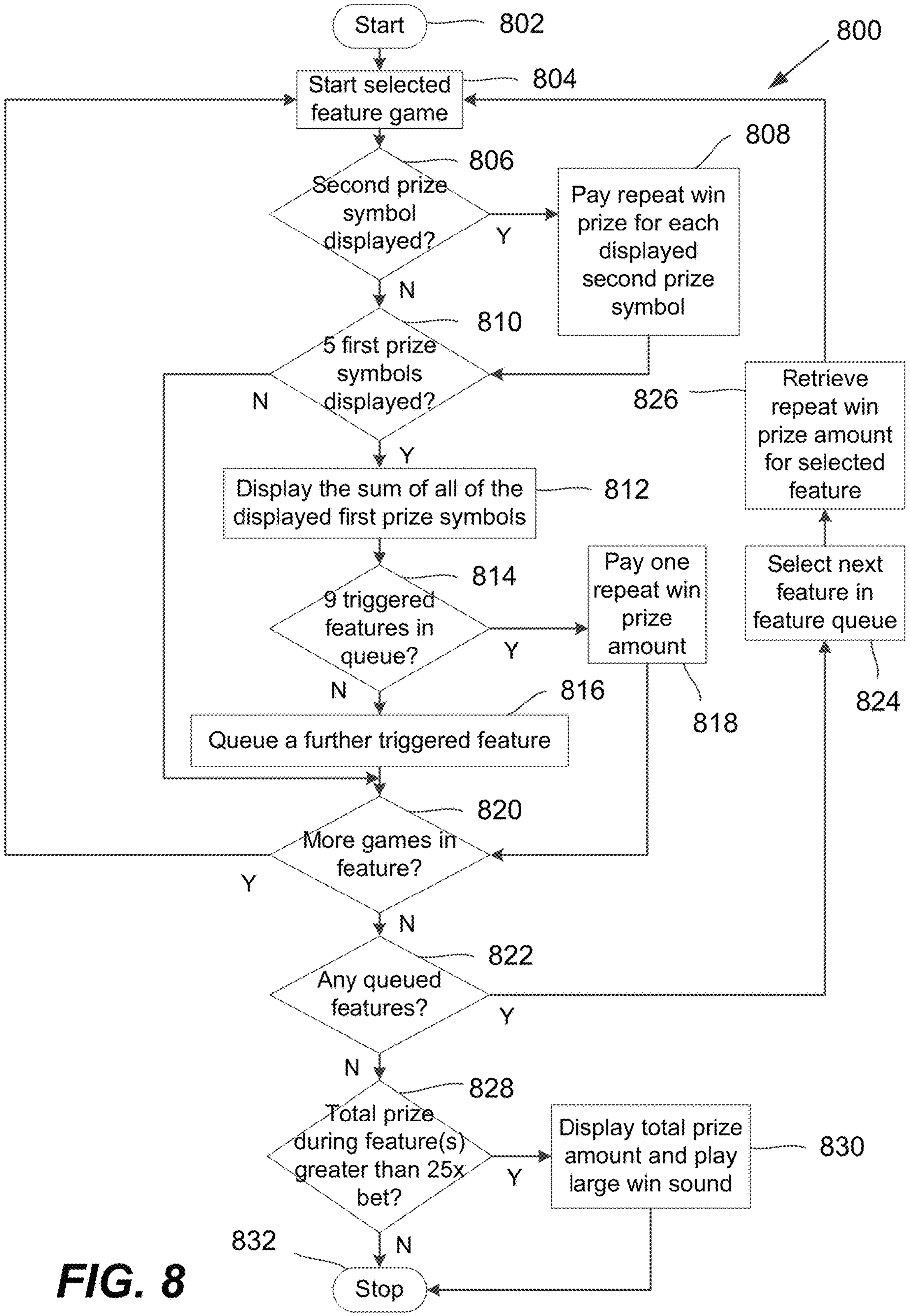
FIG. 8 is a flow chart illustrating an example feature process of an example method of gaming.

As shown in FIG. 15 and indicated at steps 802 and 804 of the flow chart 800 in FIG. 8, selection of a feature causes the feature to commence. The feature may include any number of free feature games, and in this example the number of free games is predefined and specific to the selected feature. During each feature game, a set of symbols is selected and displayed in the symbol array 1204. If a second prize symbol 1502 is selected and displayed, a prize amount equal to the repeat win amount is awarded to the player, as indicated at steps 806 and 808.

An example set of 5 reel strips 921, 922, 923, 924, 925 is shown in FIG. 9, the reel strips including both first prize symbols 930, second prize symbols 932, and WILD symbols 1208 that substitute for any symbol except first and second prize symbols 930, 932.

In this example, a representation 1504 of the second prize symbol and information indicative of the current applicable repeat win amount 1504 applicable during the feature are displayed on the top screen 1220.

Figure 16:
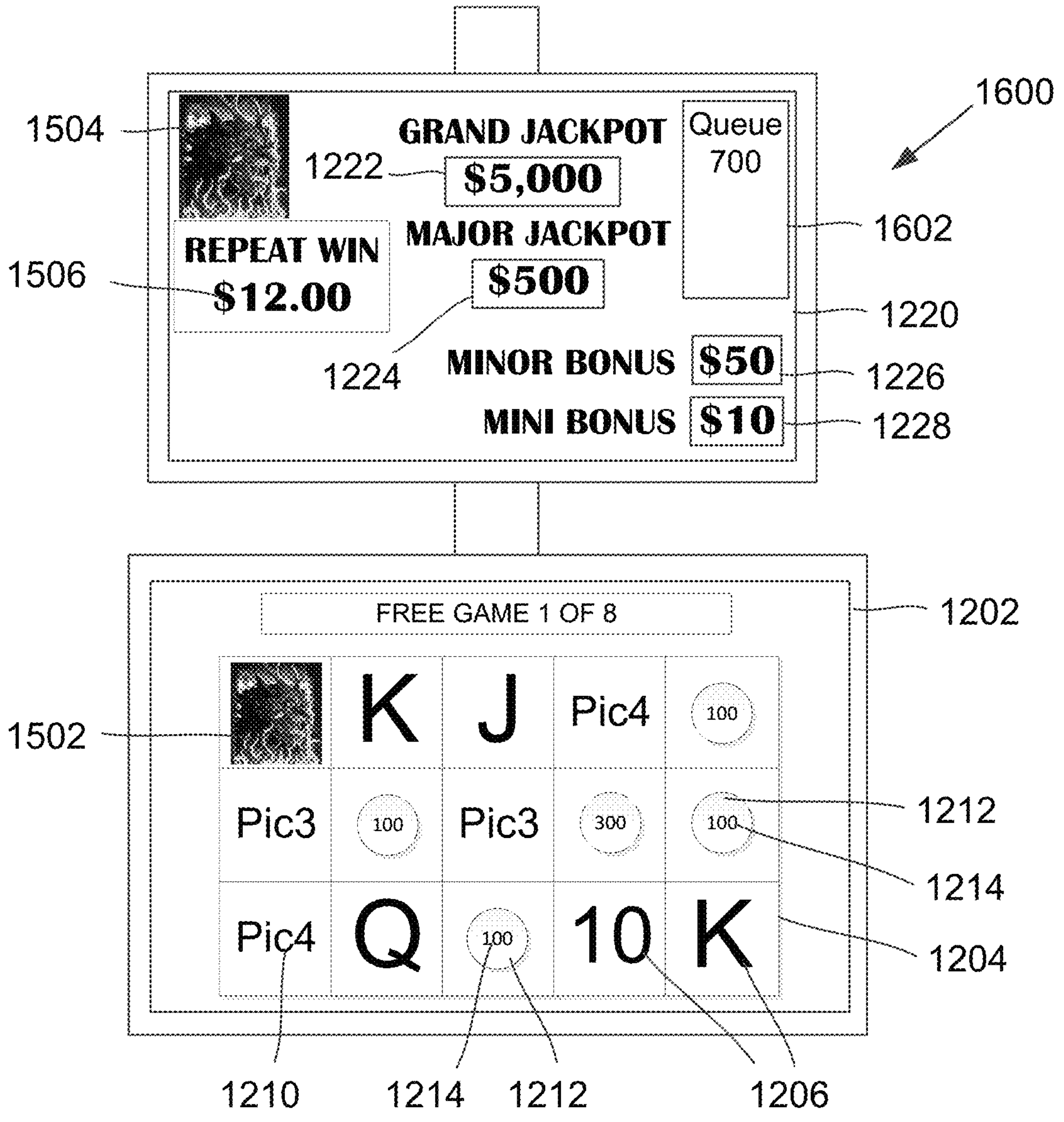
FIG. 16 is an example representation of screens of an EGM during implementation of a feature game when a trigger condition occurs during the feature game.

As shown in FIG. 16, in this example, it is possible for a trigger condition to also occur during a feature game, such that one or more further features are implemented after completion of the current feature. If a trigger condition occurs during the feature game, for example such that at least 5 first prize symbols 1212 are displayed in the symbol array 1204, and if less than 9 features have been triggered during the current implementation of the feature, the sum of the prize amounts 1214 associated with the displayed first prize symbols 1212 is displayed on the top screen 1220 in a queue 1602 and a further feature is added to a feature queue such that the further feature is implemented after completion of the current feature, as indicated at steps 810, 812, 814 and 816. This enables the player to see the applicable repeat win prize amounts for further features that will be implemented next, with the win prize amounts shown in the queue 1602 in an order according to the order that the further features will be implemented. The relevant repeat win amount for the further feature is also stored. If 9 further features are currently in the feature queue, a further feature is not added to the feature queue, and instead a repeat win prize amount corresponding to 4 times the sum of the displayed prize amounts 1214 is awarded, as indicated at step 818.

Any further games in the feature are implemented until all games of the feature have been played, as indicated at step 820, and the further features are then implemented according to their place in the feature queue, with the repeat win amount for each further feature being retrieved from storage as the further feature is implemented, as indicated at steps 822, 824 and 826.

Figure 17:
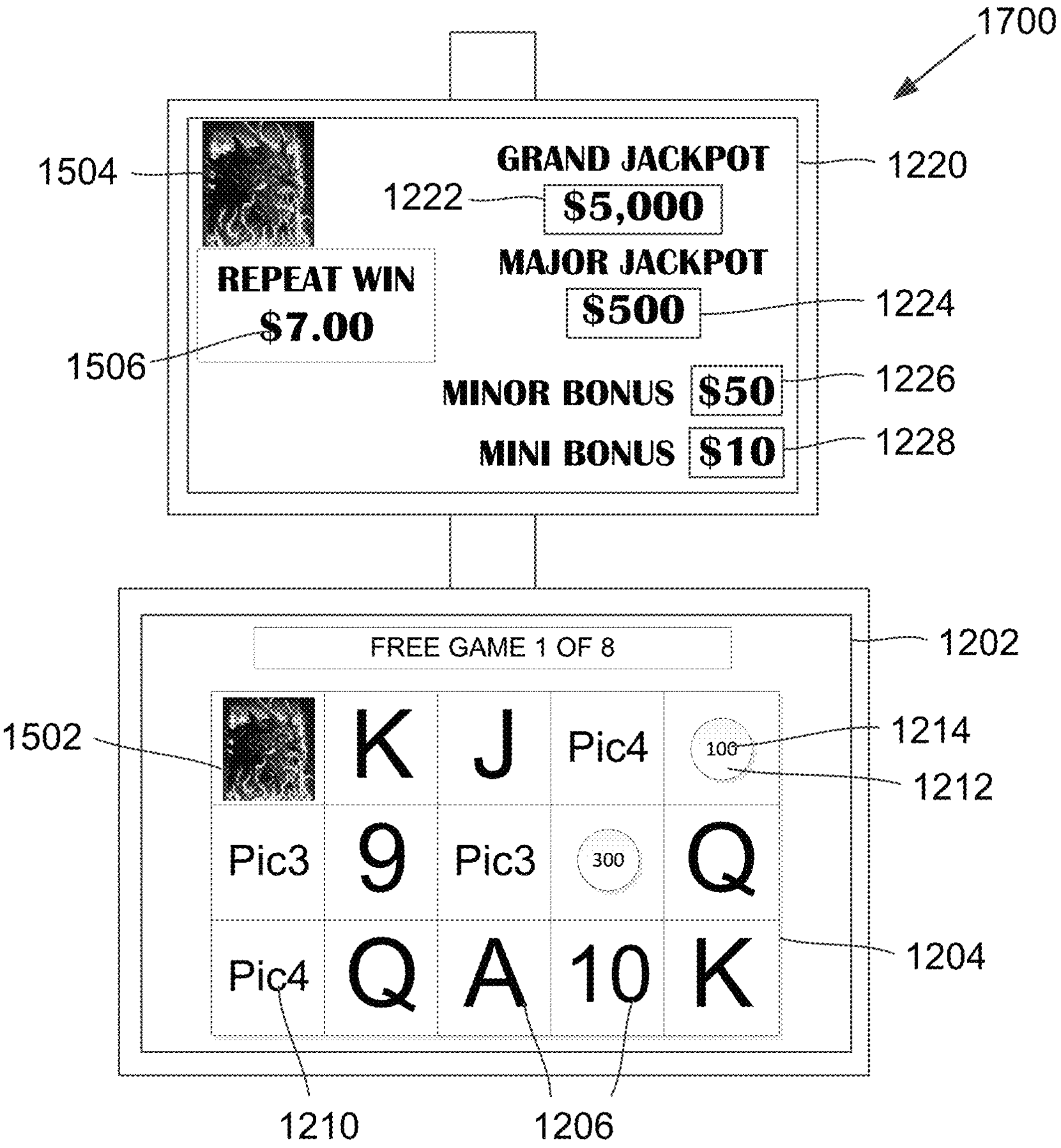
FIG. 17 is an example representation of screens of an EGM during implementation of a feature game that is implemented after a trigger condition has occurred during a previous feature game.

Representations 1700 of screens displayed to a player on a gaming machine during implementation of a further feature, that is, a feature in the feature queue, is shown in FIG. 17. As shown, since the total prize amount of the displayed first prize symbols during the previous triggering feature is equal to 700 credits (that in this example corresponds to $7.00), a repeat win amount 1506 of $7.00 is displayed on the top screen 1220 when the further feature commences.

After completion of all features and further features in the feature queue, if any, a total prize amount awarded during the feature(s) is calculated. If the total prize amount during the feature(s) is greater than 25 times the bet amount, the total prize amount is displayed and a corresponding sound produced, as indicated at steps 228 and 230. The feature process then completes, as indicated at step 832.

Figure 10:
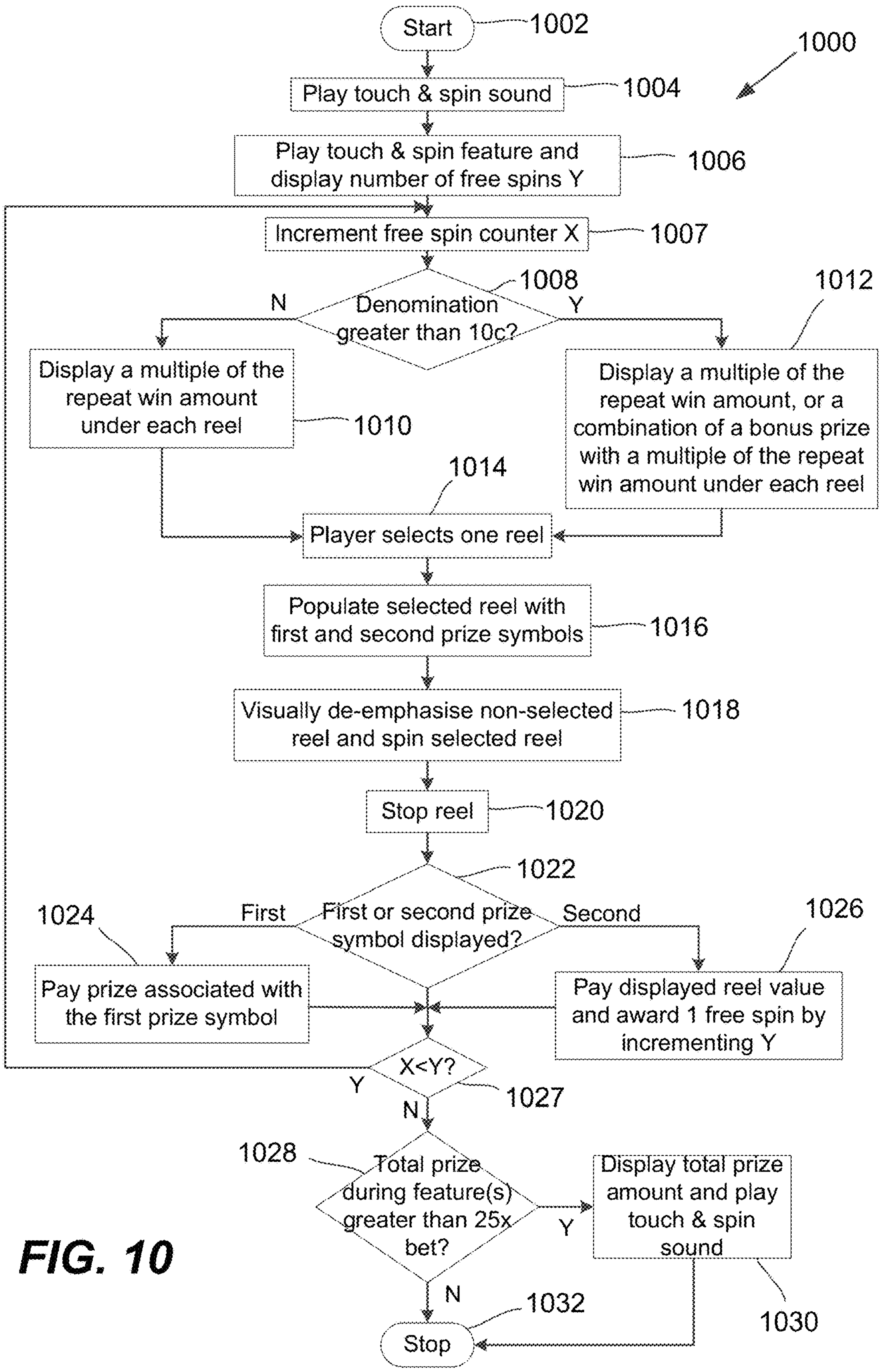
FIG. 10 is a flow chart illustrating an example special feature of an example method of gaming.
Figure 18:
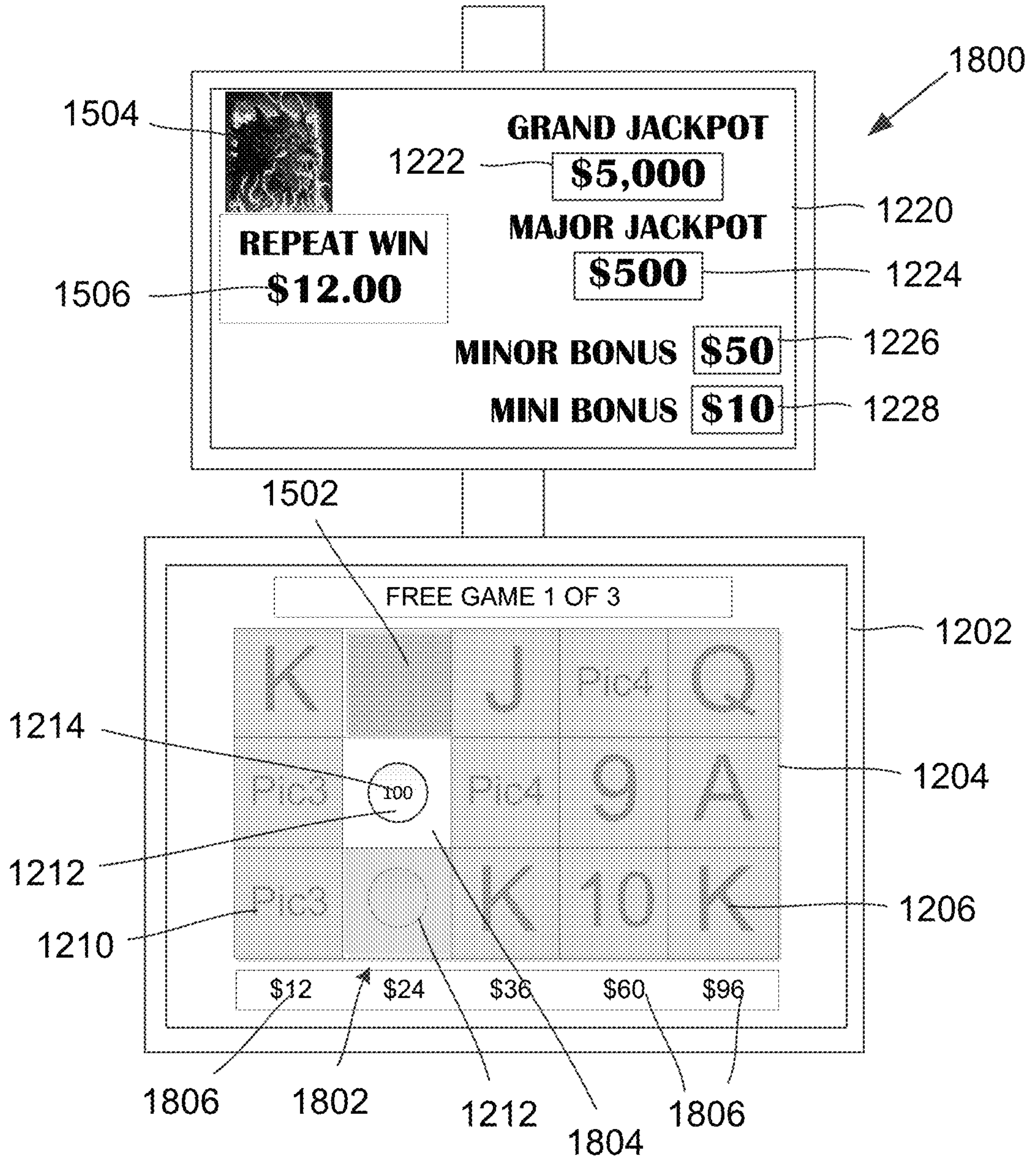
FIGS. 18 to 21 are example representations of screens of an EGM during implementation of a special feature game wherein the denomination selected by a user is less than or equal to 10c.
Figure 19:
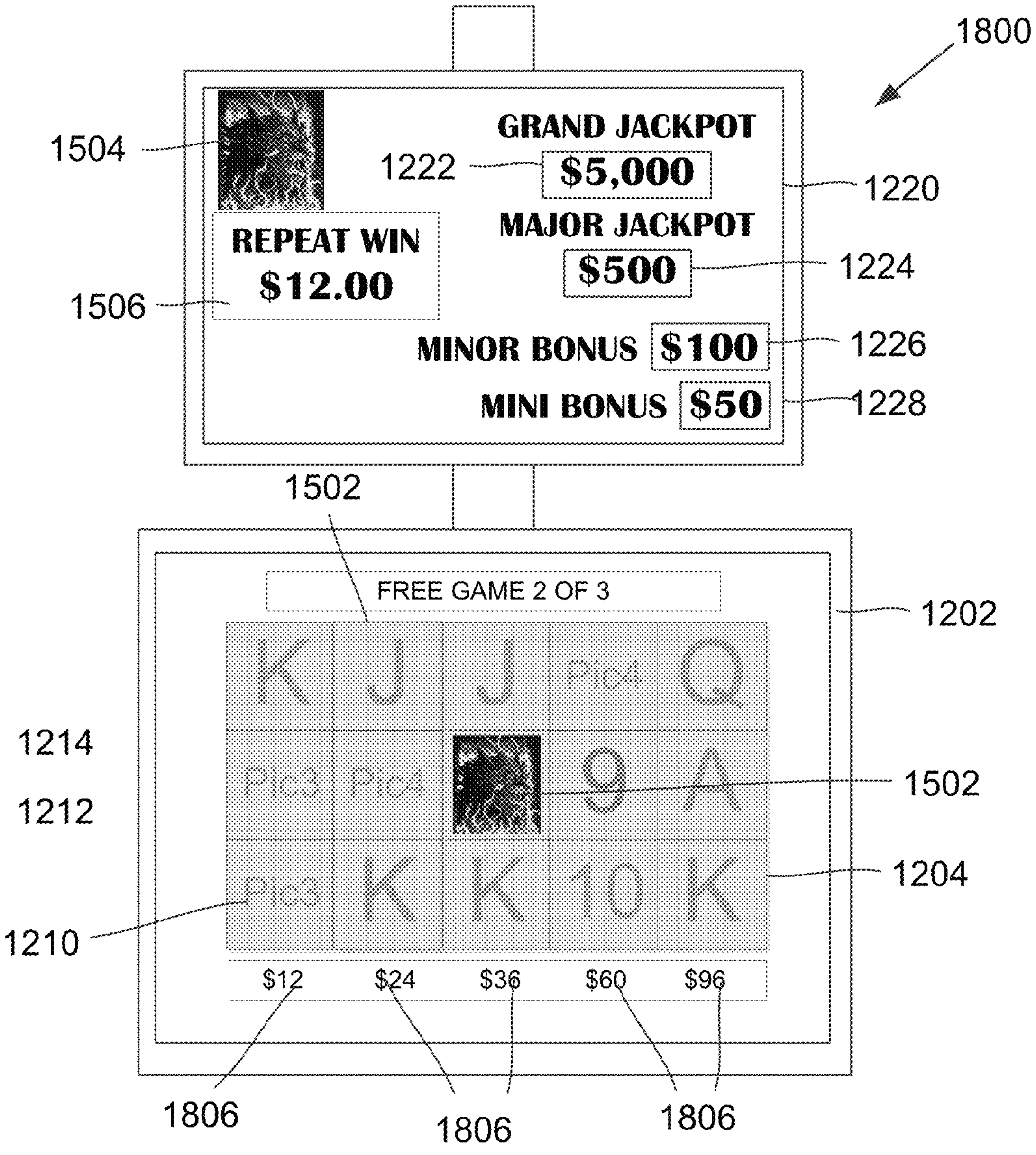

Representations 1800 of screens displayed to a player on a gaming machine when the denomination is less than or equal to 10c and a special feature—a 'touch and spin' feature—has been selected from the displayed feature indicia on the feature selection screen are shown in FIG. 18. Representations 1800 of screens displayed to a player on a gaming machine when the denomination is greater than 10c and a special feature—a 'touch and spin' feature—has been selected from the displayed feature indicia on the feature selection screen are shown in FIG. 19. A flow chart 1000 illustrating an example feature implementation process is shown in FIG. 10.

As shown in FIG. 18 and indicated at steps 1004 and 1006, selection of the touch and spin feature causes a sound associated with the touch and spin feature to be produced and the touch and spin feature to commence. A defined number of free spins Y are provided in the touch and spin feature, in this example 3 free spins.

As shown in FIG. 18, during each touch and spin feature game, a touch and spin prize amount 1806 is displayed under each reel in the symbol array 1204, as indicated at step 1010. In this example, the touch and spin prize amount 1806 is equal to the repeat win prize amount 1506 for the first reel, is equal to twice the repeat win prize amount 1506 for the second reel, is equal to three times the repeat win prize amount 1506 for the third reel, is equal to five times the repeat win prize amount 1506 for the fourth reel, and is equal to 8 times the repeat win prize amount 1506 for the fifth reel.

As indicated at step 1007, after commencement of a free spin in response to user input, a frees spin counter X is incremented by 1.

As indicated at step 1014, the player then selects one of the reels, for example using suitable buttons or a touch screen associated with the game screen 1202, and in response, the selected reel is populated with only first and second prize symbols. In addition, the selected reel is spun and displayed symbols of all other reels and of the upper and lower symbol positions of the selected reel are visually de-emphasised compared to the symbol displayed in a central location of the selected reel, as indicated at steps 1016 and 1018. During each free spin, the player is able to select any of the 5 reels irrespective of which reel has been selected in a previous free spin.

As shown in FIG. 18, in this example, in the first free spin the player has selected the second reel and therefore all symbols except the symbol displayed at a central location of the second reel are de-emphasised compared to the symbol displayed at the central location of the second reel.

As indicated at step 1020, the selected reel is then caused to stop, and a determination made as to whether a first or second prize symbol is displayed at the central location of the selected reel, as indicated at step 1022.

If the symbol displayed at the central location of the selected reel is a first prize symbol 1212, a prize is awarded to the player that corresponds to the prize amount shown on the first prize symbol, in the present example 100 credits, as indicated at step 1024. In this example, the prize amount associated with a first symbol may be 1×, 2×, 3×, 4×, 5×, 6×, 7×, 8×, 10×, 15×, 20× or 50× the credit amount bet, or may be equal to the MINI or MINOR bonus amount.

If the symbol displayed at the central location of the selected reel is a second prize symbol 1502, a prize is awarded to the player that corresponds to the prize amount shown below the selected reel, in the present example 2400 credits (corresponding to $24.00), as indicated at step 1026. Display of a second prize symbol also causes a further touch and spin feature game to be added to the tally of remaining touch and spin feature games in the current touch and spin feature.

As indicated at step 1027, if the number of available free spins Y is greater than the number of free spins already played, the process returns to step 1007 wherein the free spin counter X increments by 1 and a further free spin is implemented.

In this example, 2 further free spins are available, and accordingly a second free spin is implemented.

During the example second free spin as shown in FIG. 19, the player has selected the third reel and therefore all symbols except the symbol displayed at a central location of the third reel are de-emphasised compared to the symbol displayed at the central location of the third reel.

As indicated at step 1020, the selected reel is then caused to stop, and a determination made as to whether a first or second prize symbol is displayed at the central location of the selected reel, as indicated at step 1022.

In this example, the symbol displayed at the central location of the selected third reel is a second prize symbol 1502, and therefore a prize is awarded to the player that corresponds to the prize amount shown below the selected reel, in the present example 3600 credits (corresponding to $36.00), as indicated at step 1026. Display of a second prize symbol also causes a further free spin to be added to the number of available free spins Y.

In this example, since 2 further free spins are still available, a third free spin is implemented.

Figure 20:
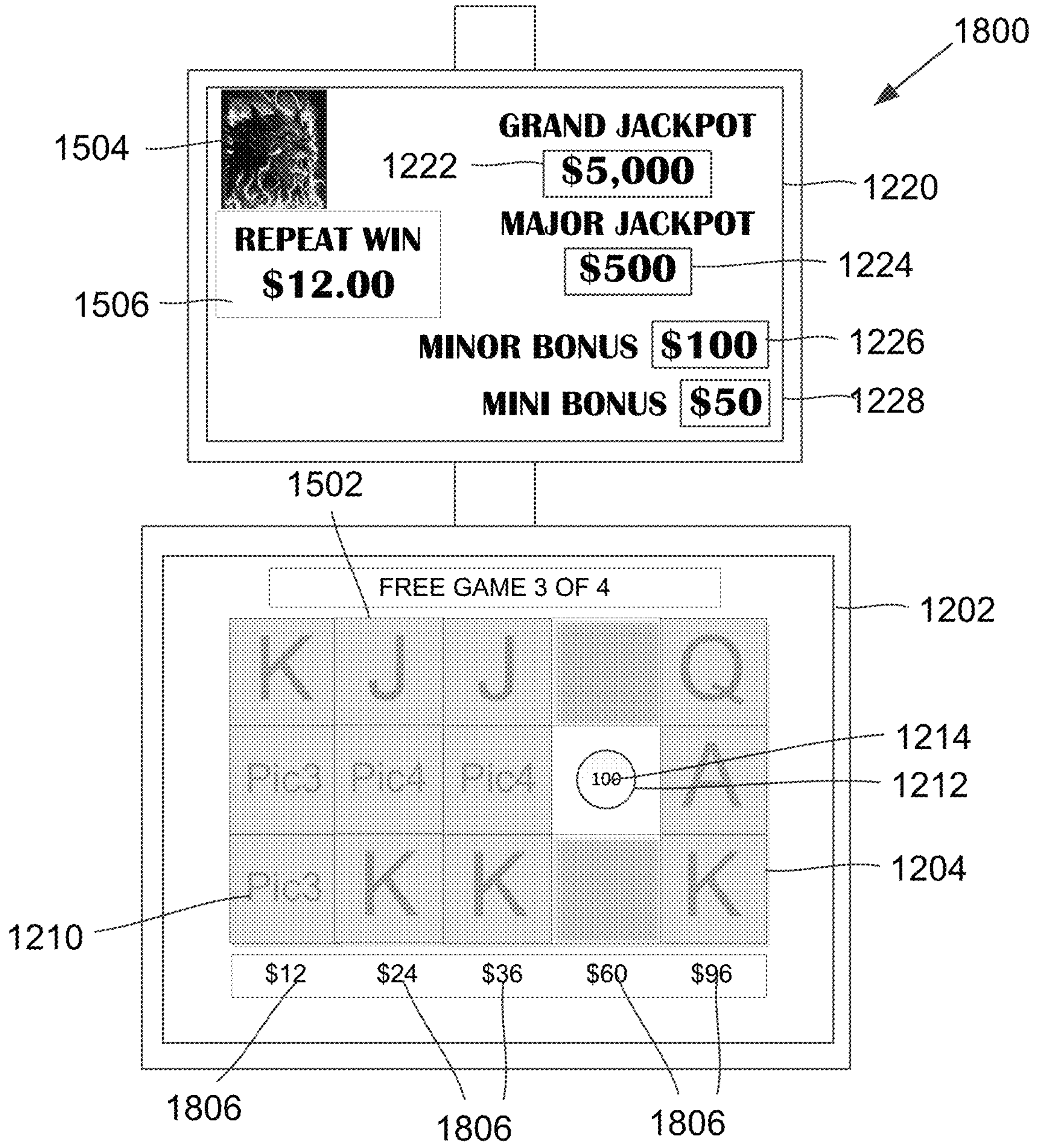
Figure 21:
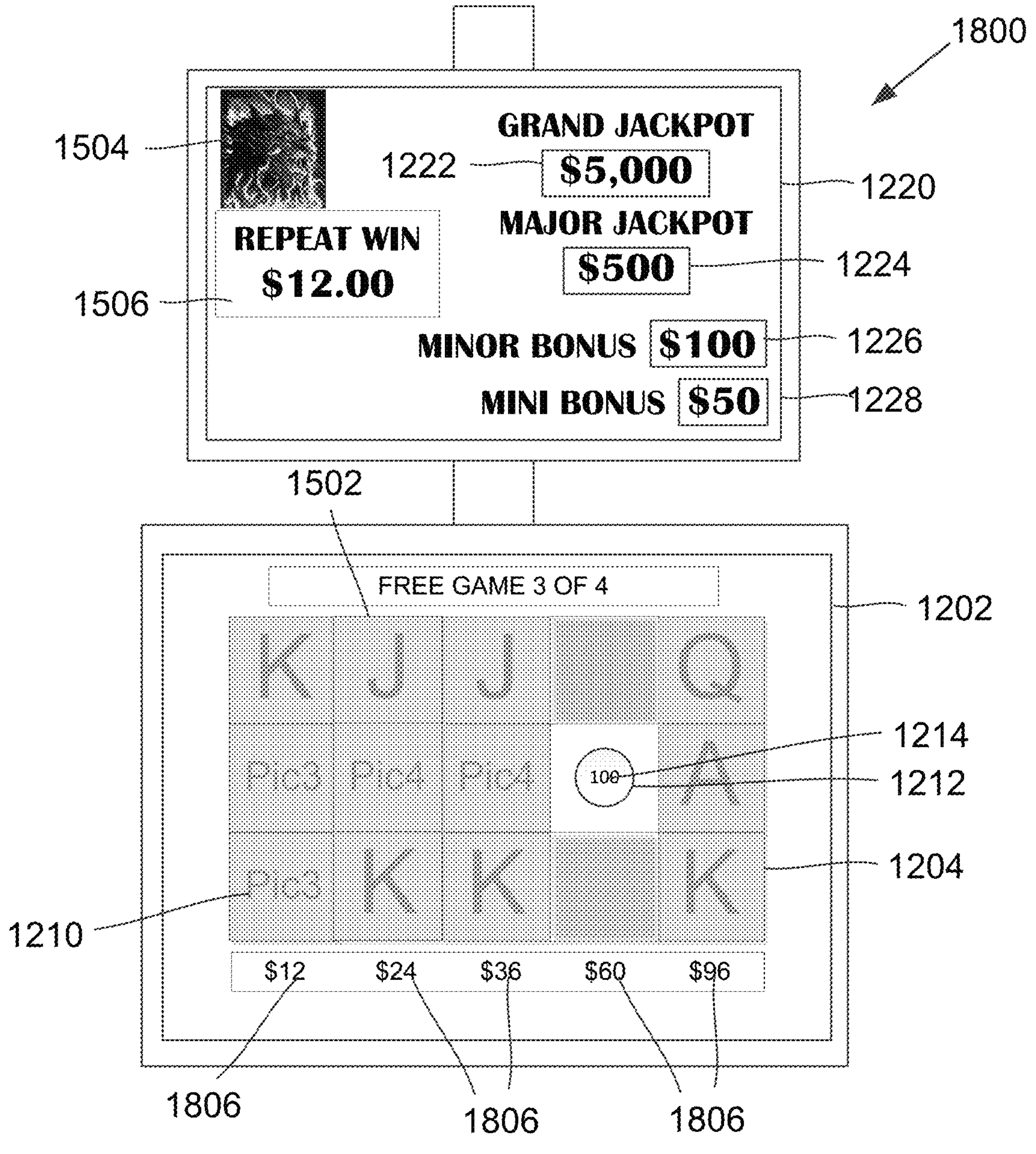

During the example third free spin as shown in FIG. 20, the player has selected the fourth reel and therefore all symbols except the symbol displayed at a central location of the fourth reel are de-emphasised compared to the symbol displayed at the central location of the fourth reel.

As indicated at step 1020, the selected reel is then caused to stop, and a determination made as to whether a first or second prize symbol is displayed at the central location of the selected reel, as indicated at step 1022.

In this example, the symbol displayed at the central location of the selected third reel is a first prize symbol 1212, and therefore a prize is awarded to the player that corresponds to the prize amount shown on the first prize symbol, in the present example 100 credits, as indicated at step 1024.

In this example, since 1 further free spin is still available, a fourth free spin is implemented.

During the example fourth free spin as shown in FIG. 21, the player has again selected the fourth reel and therefore all symbols except the symbol displayed at a central location of the fourth reel are de-emphasised compared to the symbol displayed at the central location of the fourth reel.

As indicated at step 1020, the selected reel is then caused to stop, and a determination made as to whether a first or second prize symbol is displayed at the central location of the selected reel, as indicated at step 1022.

In this example, the symbol displayed at the central location of the selected third reel is a first prize symbol 1212, and therefore a prize is awarded to the player that corresponds to the prize amount shown on the first prize symbol, in the present example 100 credits, as indicated at step 1024.

A variety of technical improvements are embodied by the present disclosure, including, for example, and as described above, with respect to the "touch and spin" feature. Specifically, in at least some embodiments, incorporation of the "touch and spin" feature adds at least one additional layer of player involvement and/or player interaction. For instance, during selection of a "touch and spin" option, as described herein, players are provided an option to select one column (or reel/reel strip) from the columns displayed during a feature game, each of which may be associated with a unique volatility win option (e.g., a unique repeat win amount or repeat win prize). During each free spin, players may select the same or a different column.

As a result, players are provided more control of the wagering game, as each free spin represents a chance to switch to a different volatility win option and requires player engagement and (touch and thought) interaction with the wagering game. Further, as a consequence of the many layers of player engagement, in at least one sense, the present wagering game may be regarded as a "deep engagement" game, in that players are provided many chances to think about and select many volatility options during cascading series of feature games.

More particularly, as described herein, in at least some instances, a plurality of additional or subsequent feature games may be added to a queue of subsequent feature games. Each subsequent feature game may, like the initial feature game, provide players an opportunity to select volatility win options (e.g., numbers of free games, repeat win amounts, and the like). Addition of a queue of multiple feature games, each associated with a particular (often unique) repeat win amount or repeat win prize (determined during a previous or preceding feature game) adds further to the "deep engagement" aspects of the present wagering game.

Figure 22:
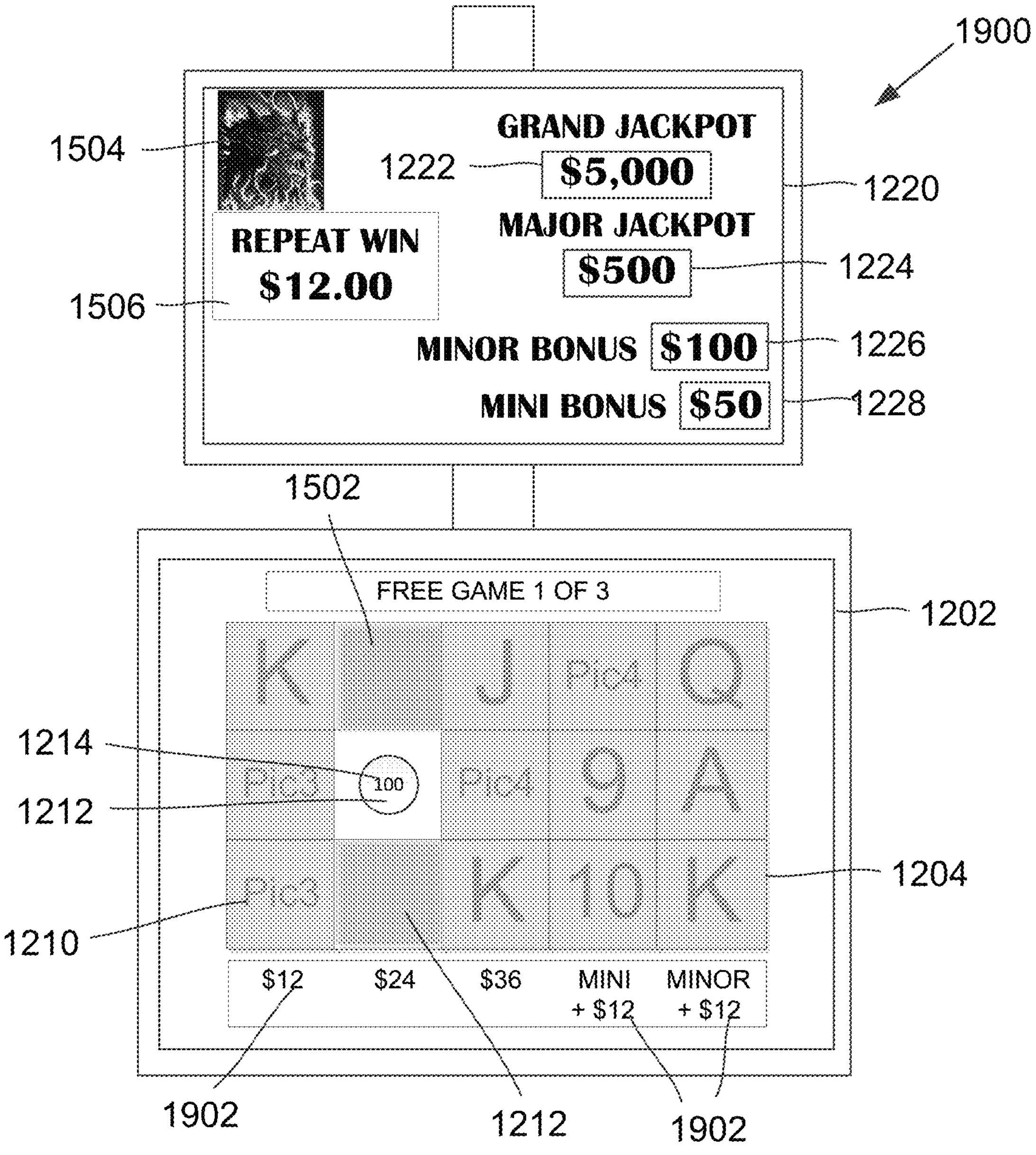
FIG. 22 is an example representation of screens of an EGM during implementation of a touch and spin feature game wherein the denomination selected by a user is greater than 10c.

Similarly, as shown in FIG. 22 and indicated at steps 1008 and 1012 in the flow chart 1000 in FIG. 10, if the denomination is greater than 10c, an alternate touch and spin prize amount 1902 is displayed under each reel in the symbol array 1204. In this example, for denominations greater than 10c, the touch and spin prize amount 1902 is equal to the repeat win prize amount 1506 for the first reel, is equal to twice the repeat win prize amount 1506 for the second reel, is equal to three times the repeat win prize amount 1506 for the third reel, is equal to the repeat win prize amount 1506 plus the MINI bonus amount 1228 for the fourth reel, and is equal to the repeat win prize amount 1506 plus the MINOR bonus amount for the fifth reel.

As indicated at step 1014, the player then selects one of the reels, for example using suitable buttons or a touch screen associated with the game screen 1202, and in response, the selected reel is populated with only first and second prize symbols. In addition, the selected reel is spun and displayed symbols of all other reels and of the upper and lower symbol positions of the selected reel are visually de-emphasised compared to the symbol displayed in the central location of the selected reel, as indicated at steps 1016 and 1018.

As shown in FIG. 22, in this example, the player has selected the second reel and therefore all symbols except the symbol displayed at a central location of the second reel are de-emphasised compared to the symbol displayed at a central location of the second reel.

As indicated at step 1020, the selected reel is then caused to stop, and a determination made as to whether a first or second prize symbol is displayed at the central location of the selected reel, as indicated at step 1022.

As with the denomination less than or equal to 10c, if the symbol displayed at the central location of the selected reel is a first prize symbol, a prize is awarded to the player that corresponds to the prize amount shown on the first prize symbol, in the present example 100 credits, as indicated at step 1024. If the symbol displayed at the central location of the selected reel is a second prize symbol, a prize is awarded to the player that corresponds to the prize amount shown below the selected reel, in the present example 2400 credits (corresponding to $24.00), as indicated at step 1026. Display of a second prize symbol also causes a further touch and spin feature game to be added to the tally of remaining touch and spin feature games in the current touch and spin feature.

After completion of all touch and spin free spins, a total prize amount is calculated. If the total prize amount during the touch and spin feature is greater than 25 times the bet amount, the total prize amount is displayed and a corresponding sound produced, as indicated at steps 1028 and 1030. The touch and spin feature process then completes, as indicated at step 1032.

Figure 11:
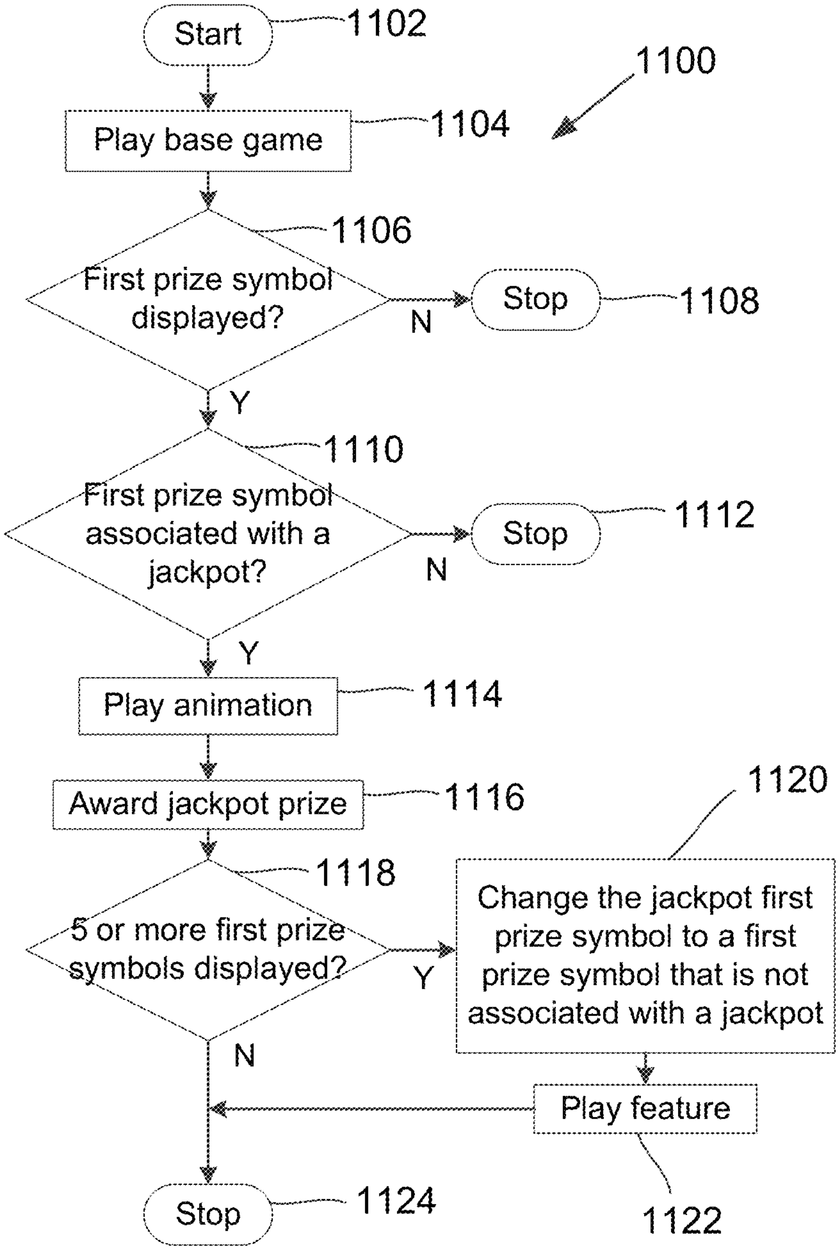
FIG. 11 is a flow chart illustrating an example jackpot awarding process of an example method of gaming.
Figure 23:
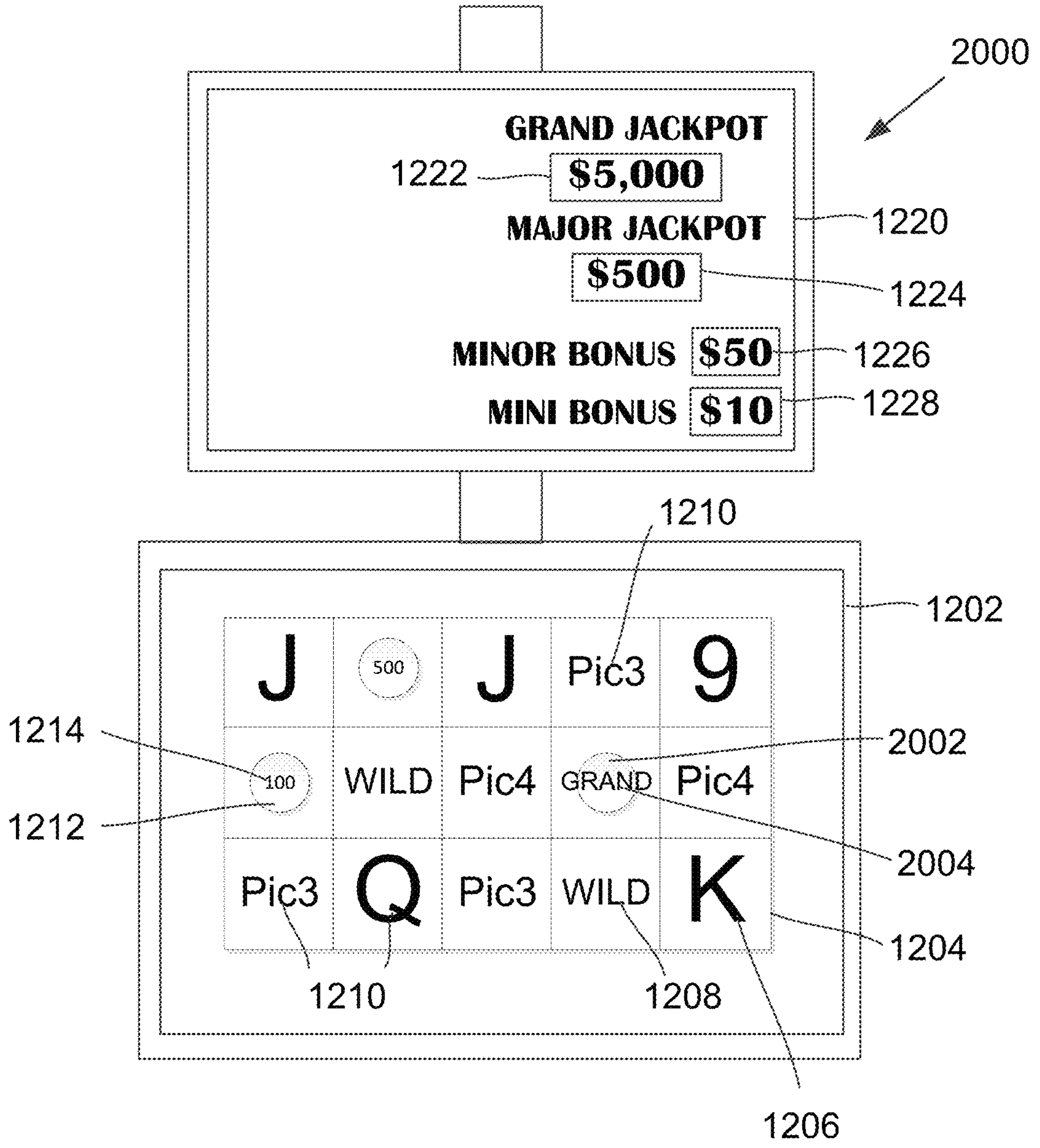
FIG. 23 is an example representation of screens of an EGM during implementation of a base game when a jackpot is triggered but a feature game is not triggered.
Figure 24:
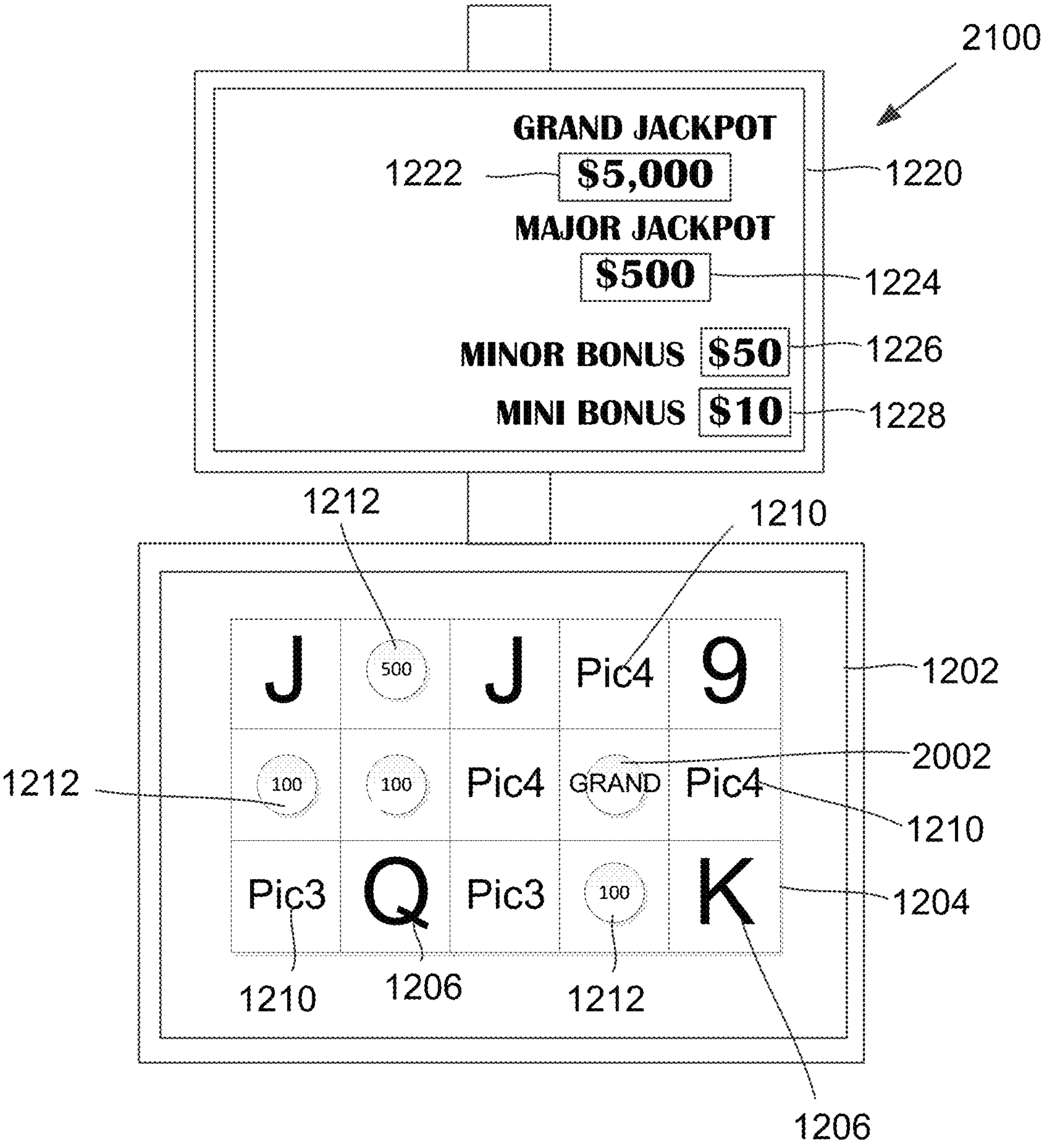
FIG. 24 is an example representation of screens of an EGM during implementation of a base game when a jackpot is triggered and a feature game is triggered.

Representations 2000 of screens displayed to a player on a gaming machine during a base game when a jackpot occurs during the base game but a trigger condition does not occur are shown in FIG. 23. Representations 2100 of screens displayed to a player on a gaming machine during a base game when a jackpot occurs during the base game and a trigger condition also occurs are shown in FIG. 24. A flow chart 1100 illustrating an example jackpot awarding process is shown in FIG. 11.

During implementation of a base game, as indicated at step 1104, if a first prize symbol is displayed, as indicated at step 1106, and the first prize symbol is associated with a jackpot, as indicated at step 1110, an animation associated with the relevant jackpot is produced, as indicated at step 1114, and a jackpot prize is awarded according to the displayed jackpot first symbol, as indicated at step 1116. In the example shown in FIG. 23 a first prize symbol 2002 that has an associated GRAND jackpot prize identifier 2004 has been selected and displayed, and therefore a prize associated with the GRAND jackpot is awarded to the player, in this example $5,000. If both a GRAND jackpot prize identifier 2004 and a MAJOR jackpot prize identifier 2004 are displayed at the same time, in this example only the GRAND jackpot amount is awarded.

In this example, a jackpot may be awarded only during a base game. However, it will be understood that other arrangements are possible. For example, a similar jackpot awarding process may be implemented during a feature game such that a jackpot may be awarded based on non-triggering and triggering conditions that occur during the feature game.

Figure 25:
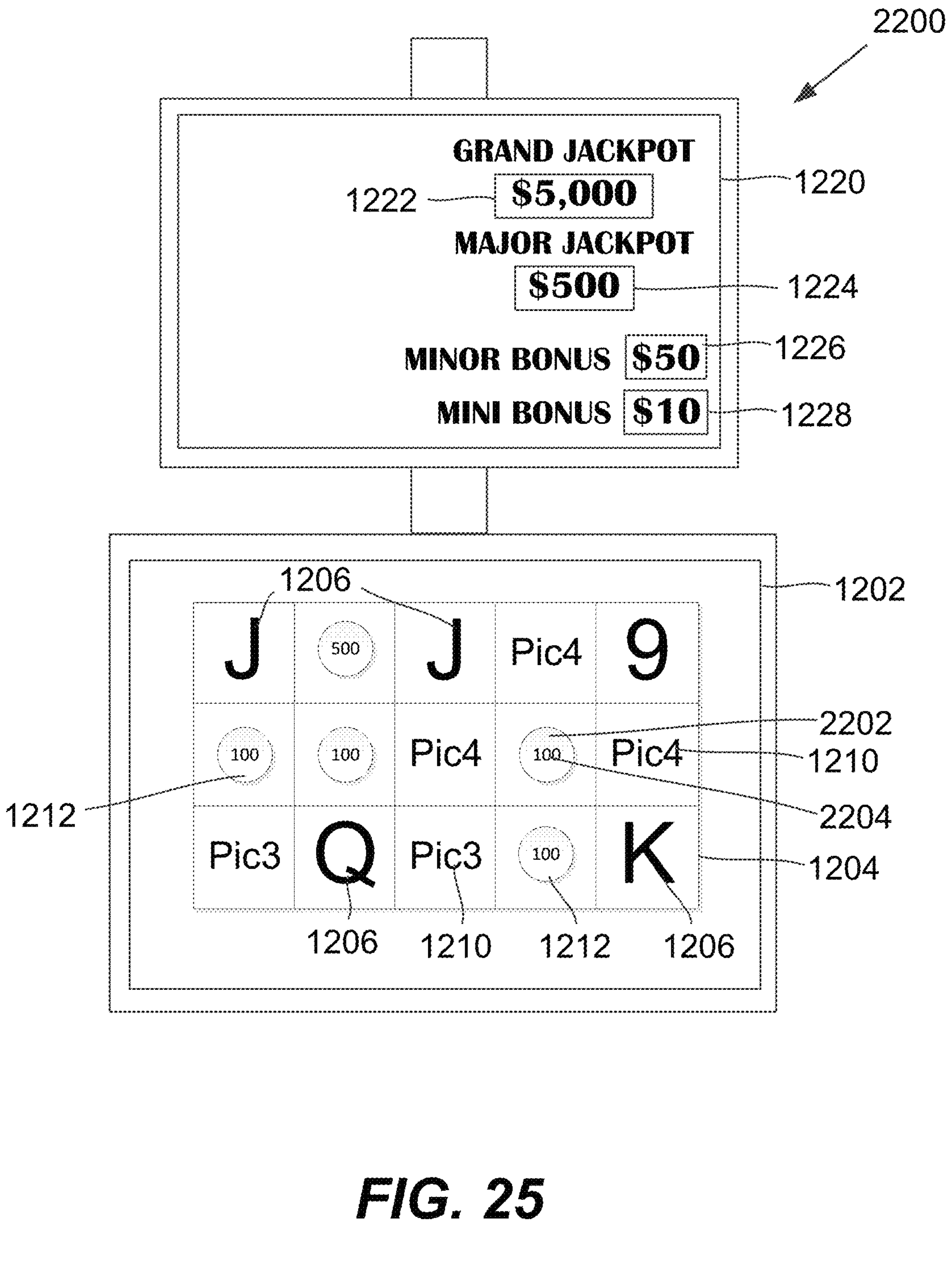
FIG. 25 is an example representation of screens of an EGM during implementation of a base game after a jackpot is triggered and a feature game has been triggered.

As shown in FIG. 24 and indicated at steps 1118 and 1120, if a jackpot first prize symbol 2002 is displayed during a base game and a trigger condition occurs, in this example selection and display of at least 5 first prize symbols, including at least one jackpot first prize symbol, the jackpot first prize symbol is changed to a non-jackpot first prize symbol 2202 with an associated defined prize amount 2204 prior to implementing the triggered feature, as shown in FIG. 25. The prize amount selected to replace the jackpot prize identifier 2004 is used to determine the repeat win amount used in the triggered feature game. The prize amount selected to replace the jackpot prize identifier 2004 may be selected randomly or in any other suitable way.

In accordance with a first aspect of the present disclosure, there is provided a gaming system comprising:

at least one display;

a game controller that includes at least one processor and at least one memory device, wherein:

the at least one processor, the at least one memory device, and the at least one display are operably connected; and the at least one memory device stores computer-readable instructions for controlling the at least one processor to:

implement a base game;

determine whether a trigger condition has occurred during the base game;

implement a feature when a trigger condition is determined to have occurred in the base game, wherein the feature is selectable from a plurality of features, at least some of the plurality of features have different associated win volatilities, and information indicative of the respective win volatilities of the plurality of selectable features is displayed;

determine a repeat win prize based on an outcome of the base game; and award a repeat win amount based on the repeat win amount during a selected feature when at least one defined prize symbol is displayed in the feature.

In an embodiment, the at least one memory device stores computer-readable instructions for controlling the at least one processor to award a repeat win prize for each defined prize symbol displayed in the feature.

In an embodiment, the repeat win amount is derived using the trigger condition.

In an embodiment, the trigger condition comprises selection and display of a plurality of first prize symbols.

In an embodiment, the trigger condition comprises selection and display of 5 or more first prize symbols.

In an embodiment, each first prize symbol includes information indicative of a prize amount associated with the first prize symbol.

In an embodiment, the prize amount is a fixed prize amount, is a prize amount that is dependent on the amount bet and/or is a prize amount that includes an amount associated with a bonus or a jackpot.

In an embodiment, the repeat win amount includes at least a sum of the prize amounts associated with the first prize symbols that form part of the trigger condition.

In an embodiment, the repeat win amount is equal to the sum of the prize amounts associated with the first prize symbols that form part of the trigger condition.

In an embodiment, the repeat win prize comprises a multiple of the repeat win amount associated with the first prize symbols that form part of the trigger condition.

In an embodiment, the multiple is twice, three times, five times, or 8 times the sum of the prize amounts associated with the first prize symbols that form part of the trigger condition.

In an embodiment, the at least one memory device stores computer-readable instructions for controlling the at least one processor to award the repeat win prize when a second prize symbol different to the first prize symbol is selected and displayed in the feature.

In an embodiment, the at least one memory device stores computer-readable instructions for controlling the at least one processor to award a spot prize when a first prize symbol is selected and displayed, the spot prize corresponding to the prize amount associated with the first prize symbol.

In an embodiment, a spot prize is awarded for each first prize symbol that is selected and displayed.

In an embodiment, the at least one memory device stores computer-readable instructions for controlling the at least one processor to award a spot prize when a first prize symbol is selected and displayed during a base game.

In an embodiment, if the prize amount associated with a selected and displayed first prize symbol includes an amount associated with a jackpot and a trigger condition exists that comprises selection and display of a plurality of first prize symbols, the at least one memory device may store computer-readable instructions for controlling the at least one processor to:

award the jackpot;

change the first prize symbol that includes the jackpot to a first prize symbol that does not include a jackpot and instead includes a fixed prize amount; and calculate a repeat win amount by summing the prize amounts associated with the first prize symbols that form part of the trigger condition, including the fixed price amount associated with the changed first prize symbol.

In an embodiment, the fixed prize amount to which the first prize symbol that includes the jackpot is changed is randomly selected.

In an embodiment, the at least one memory device stores computer-readable instructions for controlling the at least one processor to facilitate selection by a player of a denomination from a plurality of available denominations, wherein the selected denomination is used to determine the win volatilities of the plurality of selectable features.

In an embodiment, the win volatility is based on the number of free games and/or the repeat win prize available in the selectable features and/or the number of second prize symbols available for selection and display in the feature.

In an embodiment, the at least one memory device stores computer-readable instructions for controlling the at least one processor to:

determine whether a trigger condition has occurred during a current feature;

queue a further feature when a trigger condition is determined to have occurred in the current feature;

implement the further feature after completion of the current feature;

determine a repeat win amount for the further feature based on an outcome of the current feature; and award a repeat win prize based on the repeat win amount during the further feature when at least one defined prize symbol is displayed in the further feature.

In an embodiment, the repeat win amount for the further feature is derived using the trigger condition in the current feature.

In an embodiment, the trigger condition in the current feature comprises selection and display of a plurality of defined first prize symbols, such as 5 or more first prize symbols.

In an embodiment, the at least one memory device stores computer-readable instructions for controlling the at least one processor to:

determine whether a trigger condition has occurred during the current feature;

if a trigger condition is determined to have occurred during the current feature, determine whether a defined number of further features are queued; and if a defined number of further features are queued, do not add a further feature to the queue, and instead award a repeat win prize based on the repeat win amount.

In an embodiment, the plurality of features include a special feature, the special feature comprising a plurality of reels, each reel having an associated displayed special feature prize amount, wherein during the special feature the at least one memory device stores computer-readable instructions for controlling the at least one processor to:

facilitate selection by a player of one of the reels;

populate the selected reel with first and second prize symbols, each first prize symbol having an associated prize amount;

spin and stop the selected reel;

award a prize to the player that corresponds to the prize amount associated with the first prize symbol if the symbol displayed at the central location of the selected reel is a first prize symbol;

award a prize to the player that corresponds to the special feature prize amount associated with the selected reel if the symbol displayed at the central location of the selected reel is a second prize symbol.

In an embodiment, all displayed symbols other than a symbol displayed at a defined location on the selected reel are visually de-emphasised compared to the symbol displayed at the defined location of the selected reel.

In an embodiment, the defined location is a central location of the selected reel.

In an embodiment, the special feature prize amount for each reel is based on a multiple of the repeat win amount.

In an embodiment, the special feature prize amount for each reel is dependent on the denomination selected by a player.

In an embodiment, if the denomination is less than or equal to a defined amount, the special feature prize amounts for the reels include at least some special feature prize amounts that are equal to a multiple of the repeat win prize amount, wherein at least some of the special feature prize amounts are different.

In an embodiment, if the denomination is less than or equal to a defined amount, the special feature prize amount is equal to the repeat win prize amount for the first reel, is equal to twice the repeat win prize amount for the second reel, is equal to three times the repeat win prize amount for the third reel, is equal to five times the repeat win prize amount for the fourth reel, and is equal to 8 times the repeat win prize amount for the fifth reel.

In an embodiment, if the denomination is greater than a defined amount, the special feature prize amounts for the reels include at least some special feature prize amounts that are equal to a multiple of the repeat win prize amount, and at least one special feature prize amount that includes a bonus amount, wherein at least some of the special feature prize amounts are different.

In an embodiment, if the denomination is greater than a defined amount, the special feature prize amount is equal to the repeat win prize amount for the first reel, is equal to twice the repeat win prize amount for the second reel, is equal to three times the repeat win prize amount for the third reel, is equal to the repeat win prize amount plus a first bonus amount for the fourth reel, and is equal to the repeat win prize amount plus a second bonus amount greater than the first bonus amount for the fifth reel.

In accordance with a second aspect of the present disclosure, there is provided a method of gaming comprising:

implementing a base game and displaying base game outcomes on a display;

determining whether a trigger condition has occurred during the base game;

displaying information indicative of a plurality of features when a trigger condition is determined to have occurred in the base game displaying information indicative of the respective win volatilities of the plurality of features, wherein at least some of the plurality of features have different associated win volatilities;

facilitating selection of a feature by a player;

determining a repeat win amount based on an outcome of the base game; and awarding a repeat win prize based on the repeat win amount during a selected feature when at least one defined prize symbol is displayed in the feature.

While the disclosure has been described with respect to the FIGS., it will be appreciated that many modifications and changes may be made by those skilled in the art without departing from the spirit of the disclosure. Any variation and derivation from the above description and Figures are included in the scope of the present disclosure as defined by the claims.

What is claimed is:

1. An electronic gaming system comprising:

a memory; and a processor configured to execute instructions stored in the memory, which when executed, cause the processor to at least:

cause display of an array of symbols on a display device for play of a base game, each symbol in the array of symbols selected from a reel strip of a plurality of reel strips, wherein at least one reel strip of the plurality of reel strips includes a spot prize symbol;

generate an output of a random number generator (RNG);

perform a lookup of weight tables using the RNG output to assign a spot prize value to the spot prize symbol;

in response to occurrence of a trigger condition during play of the base game, cause display of a plurality of selections, each selection corresponding to a feature game of a plurality of feature games, each feature game associated with a win volatility and displayed in association with information about the win volatility, each win volatility based, at least in part, upon a repeat win amount, the repeat win amount being based on the spot prize value assigned to the spot prize symbol.

2. The electronic gaming system of claim 1, wherein the instructions, when executed, further cause the processor to at least, in response to the trigger occurring during the base game: cause display of a first feature game of the plurality of games at the display device, in response to a player selection corresponding to the first feature game of the plurality of games; and award a repeat win prize based on play of the first feature game, the repeat win prize being based on the repeat win amount.

3. The electronic gaming system of claim 2, wherein the repeat win prize is awarded in response to at least one feature prize symbol being displayed during the first feature game.

4. The electronic gaming system of claim 1, wherein a predefined number of spot prize symbols being displayed in the array of symbols is the trigger condition.

5. The electronic gaming system of claim 4, wherein each spot prize symbol included in the array of symbols includes a corresponding fixed spot prize value, and wherein the instructions, when executed, further cause the processor to at least: display an increase in the repeat win amount corresponding to the fixed spot prize value of each spot prize symbol included in the array.

6. The electronic gaming system of claim 1, wherein each feature game of the plurality of feature games is associated with a number of free games and a multiple of the repeat win amount, whereby the win volatility of each feature game is based at least in part on the number of free games associated with each feature game and the multiple of the repeat win amount.

7. The electronic gaming system of claim 1, wherein a first feature game of the plurality of feature games is associated with a first number of free games and the repeat win amount, and wherein a second feature game of the plurality of feature games is associated with a second number of free games and a multiple of the repeat win amount, the second number of free games being less than the first number of free games.

8. The electronic gaming system of claim 1, wherein at least one feature game of the plurality of feature games is associated with an interactive series of free games, and wherein the instructions, when executed, further cause the processor to at least:

cause display of an additional array of symbols on the display device, the additional array of symbols including a plurality of columns and a plurality of rows, each column configured to display symbols selected from an associated reel strip of the plurality of reel strips;

receive a player selection of one column of the array;

cause display on the display device of spinning and stopping of the associated reel strip in the player selected column;

determine whether at least one symbol displayed in the player selected column is a defined symbol; and in response to the at least one symbol being the defined symbol, award a repeat win prize, the repeat win prize being based on the repeat win amount.

9. The electronic gaming system of claim 8, wherein the instructions, when executed, further cause the processor to at least: receive a selection from the player of one of the plurality of columns of the array, wherein player selection of a first column of the array causes the repeat win amount to be a first multiple of the repeat win amount and player selection of a second column of the array causes the repeat win amount to be a second different multiple of the repeat win amount.

10. The electronic gaming system of claim 1, wherein the instructions, when executed, further cause the processor to at least: in response to occurrence of an additional trigger condition, displaying a subsequent feature game added to a queue of subsequent feature games.

11. The electronic gaming system of claim 10, wherein the instructions, when executed, further cause the processor to at least: display a subsequent repeat win amount during a first feature game of the plurality of feature games, the subsequent repeat win amount based upon symbols displayed during the player selected feature game.

12. The electronic gaming system of claim 10, wherein the instructions, when executed, further cause the processor to at least:

cause display of the queue of subsequent feature games on the display device to provide a visual indication of a number of subsequent feature games in the queue of subsequent feature games.

13. The electronic gaming system of claim 10, wherein the instructions, when executed, further cause the processor to at least: in response to completion of a first feature game of the plurality of feature games, initiate a next subsequent feature game from the queue of subsequent feature games, wherein the next subsequent feature game in the queue of subsequent feature games is associated with a plurality of feature game win volatility options, and wherein the instructions, when executed, further cause the processor to at least:

receive a player selection of one feature game win volatility option.

14. A non-transitory computer-readable medium containing instructions embodied thereon, which when executed by a processor, cause the processor to at least:

cause display of an array of symbols for play of a base game, each symbol in the array of symbols selected from a reel strip of a plurality of reel strips, wherein at least one reel strip of the plurality of reel strips includes a spot prize symbol;

generate an output of a random number generator (RNG);

perform a lookup of weight tables using the RNG output to assign a spot prize value to the spot prize symbol; and in response to occurrence of a trigger condition during play of the base game, cause display of a plurality of selections, each selection corresponding to a feature game of a plurality of feature games, each feature game associated with a win volatility and for display in association with information about the win volatility, each win volatility based, at least in part, on a repeat win amount, the repeat win amount being based on the spot prize value assigned to the spot prize symbol.

15. The non-transitory computer-readable medium of claim 14, wherein the instructions, when executed, further cause the processor to at least: in response to the trigger condition occurring during the base game and a player selection corresponding to a first feature game of the plurality of feature games: cause a display of the first feature game and award a repeat win prize during play of the first feature game, the repeat win prize being based on the repeat win amount.

16. The non-transitory computer-readable medium of claim 15, wherein the repeat win prize is awarded in response to at least one feature prize symbol being displayed during the first feature game.

17. The non-transitory computer-readable medium of claim 14, wherein a predefined number of spot prize symbols being displayed in the array of symbols is the trigger condition.

18. A method for providing a game on an electronic gaming system, the method comprising:

causing display of an array of symbols for play of a base game, each symbol in the array of symbols selected from a reel strip of a plurality of reel strips, wherein at least one reel strip of the plurality of reel strips includes a spot prize symbol;

generate an output of a random number generator (RNG);

perform a lookup of weight tables using the RNG output to assign a spot prize value to the spot prize symbol, a repeat win amount based on the spot prize value; and in response to occurrence of a trigger condition during play of the base game, causing display of a plurality of selections, each selection corresponding to a feature game of a plurality of feature games, each feature game associated with a win volatility and for display in association with information about the win volatility, each win volatility based, at least in part, on a repeat win amount, the repeat win amount being based on the spot prize value assigned to the spot prize symbol.

19. The method of claim 18 further comprising:

in response to the trigger condition occurring during the base game and a player selection corresponding to a first feature game of the plurality of feature games:

causing display of the first feature game; and awarding a repeat win prize during play of the first feature game, the repeat win prize being based on the repeat win amount.

20. The method of claim 19, wherein the repeat win prize is awarded in response to at least one feature prize symbol being displayed during the first feature game.

* * * * *